United States Patent
Mitsuyama

(10) Patent No.: US 6,694,782 B2
(45) Date of Patent: Feb. 24, 2004

(54) COMMODITY ANTITHEFT IMPLEMENT

(76) Inventor: Masuhiro Mitsuyama, 1071, Kinugasa, Wake-cho, Wake-gun, Okayama (JP), 709-0441

(*) Notice: Subject to any disclaimer, the term of this patent is extended or adjusted under 35 U.S.C. 154(b) by 0 days.

(21) Appl. No.: 10/226,259

(22) Filed: Aug. 23, 2002

(65) Prior Publication Data

US 2002/0194888 A1 Dec. 26, 2002

Related U.S. Application Data

(62) Division of application No. 09/867,568, filed on May 31, 2001, now abandoned.

(30) Foreign Application Priority Data

| Jun. 19, 2000 | (JP) | ............ | 2000-223096 |
| Nov. 10, 2000 | (JP) | ............ | 2000-382969 |

(51) Int. Cl.[7] .................................. B65D 85/67
(52) U.S. Cl. .................. 70/57.1; 70/63; 206/1.5; 206/308.2; 206/387.11
(58) Field of Search ................ 70/57.1, 63, 58; 206/1.5, 308.2, 387.11

(56) References Cited

U.S. PATENT DOCUMENTS

| 3,514,981 A | 6/1970 | Esquibel et al. ............... 70/298 |
| 3,995,900 A | 12/1976 | Humble et al. ............. 292/316 |
| 4,285,429 A | 8/1981 | MacTavish ............. 206/1.5 X |
| 4,567,983 A | 2/1986 | Morris ................... 206/1.5 X |
| 4,573,332 A | 3/1986 | Ma ............................... 70/30 |
| 4,658,955 A | 4/1987 | Eichner .................... 206/1.5 X |
| 4,799,370 A | 1/1989 | Cooper ........................... 70/63 |
| 5,255,543 A | 10/1993 | Wittman ..................... 70/57.1 |
| 5,350,150 A | 9/1994 | Fiore ......................... 70/62 X |
| 5,375,712 A | 12/1994 | Weisburn ................. 206/1.5 X |
| 5,417,319 A | 5/1995 | Chalberg et al. ............. 206/1.5 |
| 5,566,828 A | 10/1996 | Claes et al. ................. 70/63 X |
| 5,597,068 A * | 1/1997 | Weisburn et al. ......... 206/308.1 |
| 5,769,218 A * | 6/1998 | Yabe ....................... 206/308.2 |
| 5,823,341 A | 10/1998 | Nakasuji ................ 206/387.11 |
| 5,944,185 A | 8/1999 | Burdett et al. ......... 206/387.11 |
| 6,102,200 A | 8/2000 | Dressen et al. .......... 206/308.2 |
| 6,202,454 B1 * | 3/2001 | Nakasuji ..................... 70/57.1 |
| 6,240,750 B1 | 6/2001 | Gillespie et al. ............. 70/57.1 |
| 6,374,648 B1 * | 4/2002 | Mitsuyama ................. 70/57.1 |
| 6,497,125 B1 * | 12/2002 | Necchi ....................... 70/57.1 |
| 6,516,639 B1 * | 2/2003 | Margetts et al. ............. 70/57.1 |
| 6,561,347 B1 * | 5/2003 | Lax ......................... 206/308.2 |
| 2002/0003095 A1 * | 1/2002 | Jaeb et al. ............... 206/308.2 |

FOREIGN PATENT DOCUMENTS

| WO | WO 00/17877 | * | 3/2000 |

* cited by examiner

Primary Examiner—Lloyd A. Gall
(74) Attorney, Agent, or Firm—Wenderoth, Lind & Ponack L.L.P.

(57) ABSTRACT

A commodity antitheft implement includes a box body including an opening portion for removing and inserting a commodity and a cover body attached to the box body through hinges to open and close the opening portion. Opening of the case is made difficult by inserting a key member into through holes provided at overlapping peripheral walls of the case.

15 Claims, 30 Drawing Sheets

FIG.4
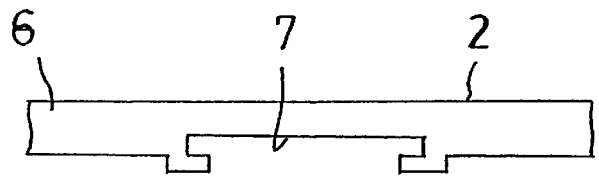
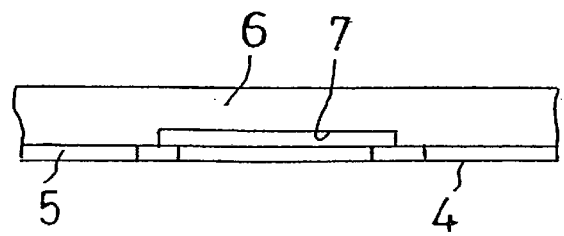
FIG.5
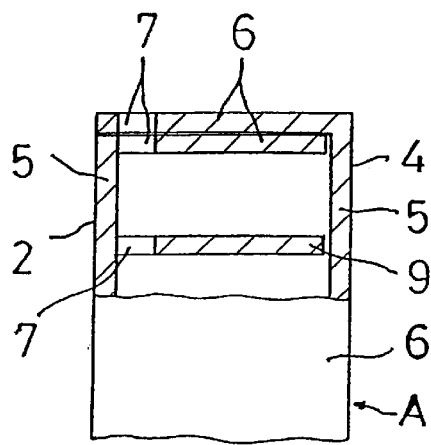
FIG.6
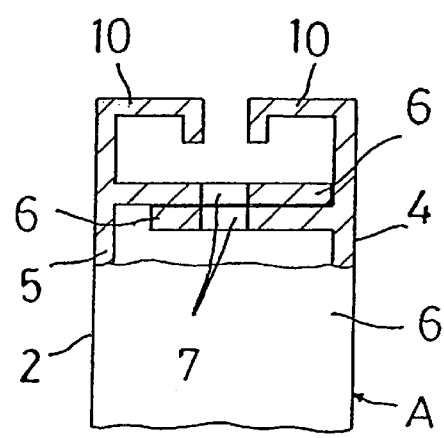
FIG.7
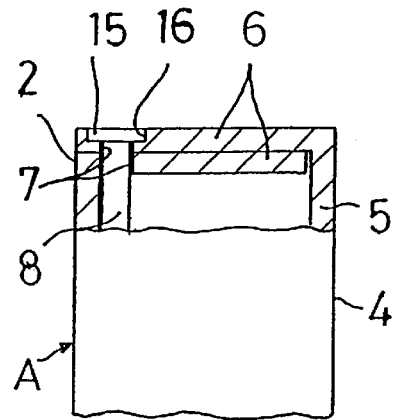

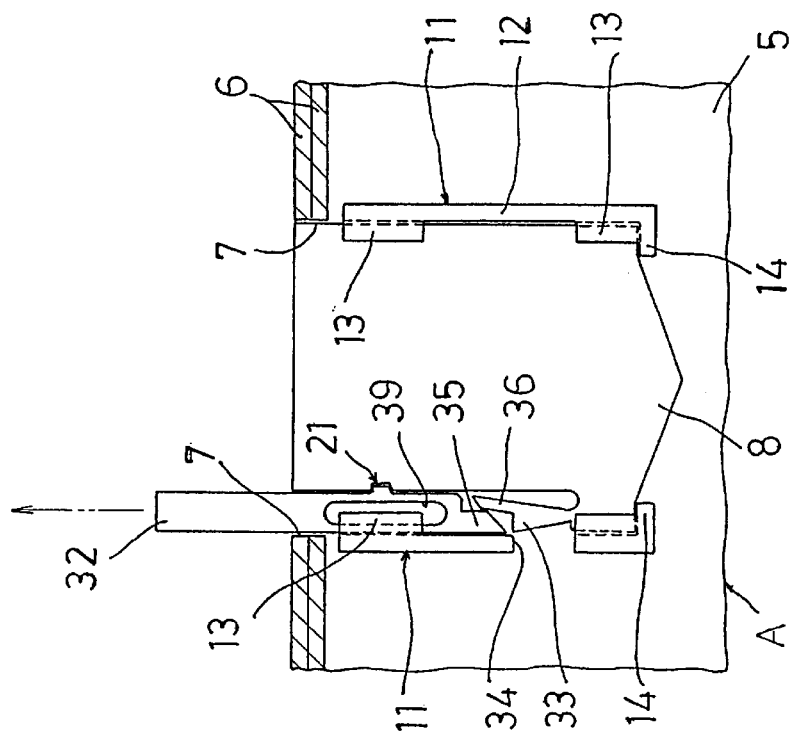
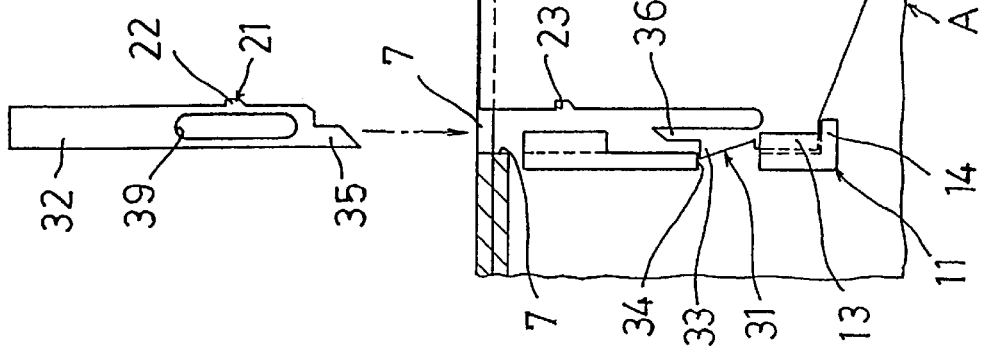

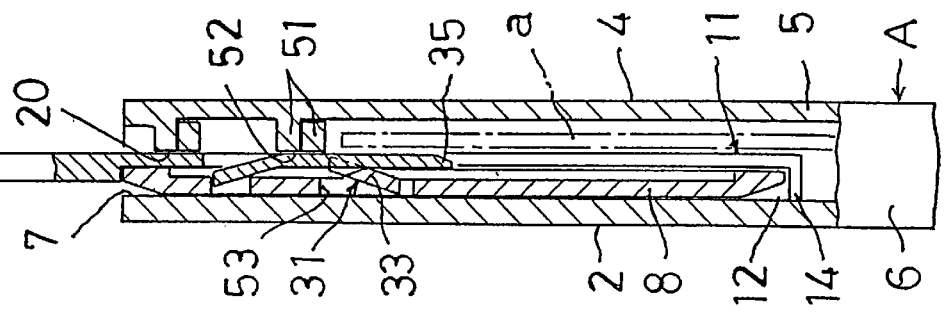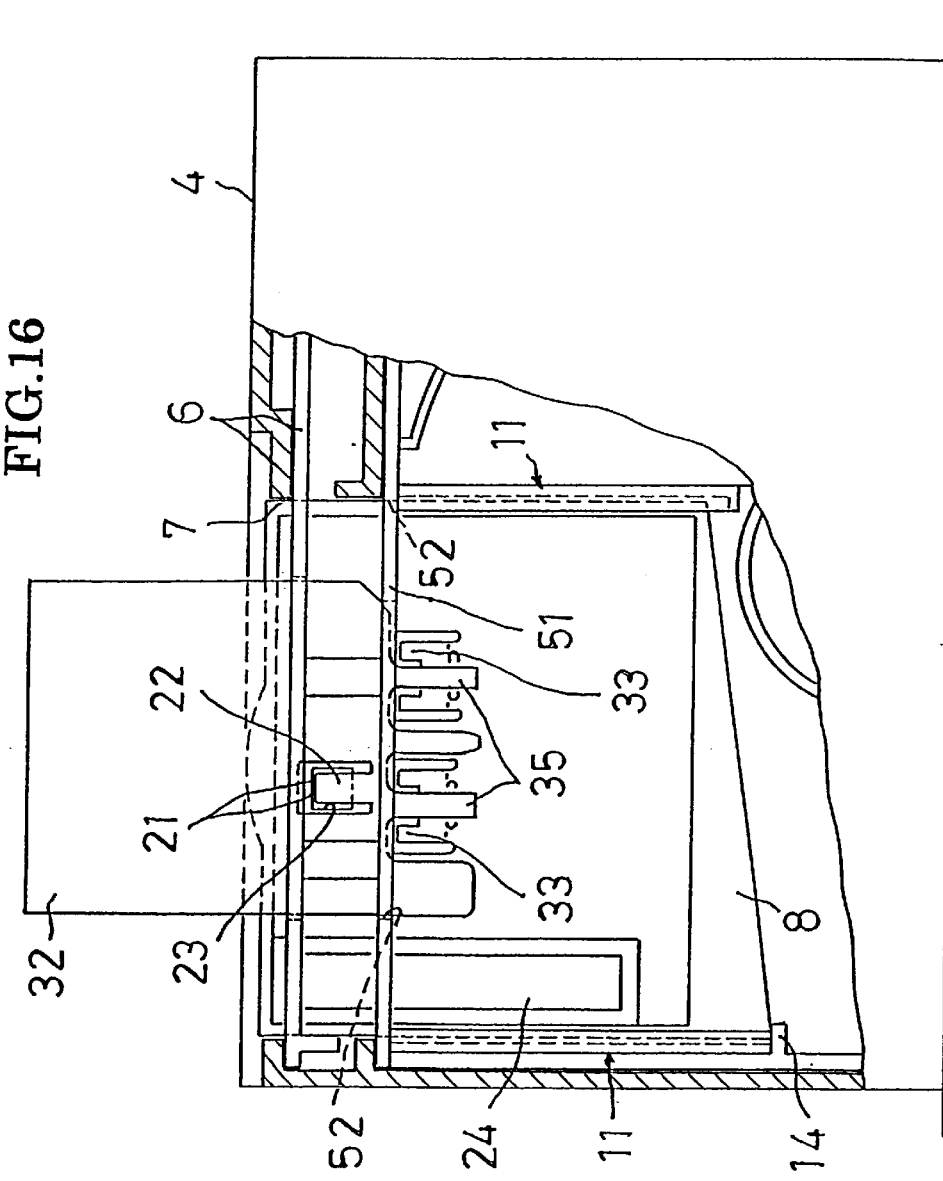

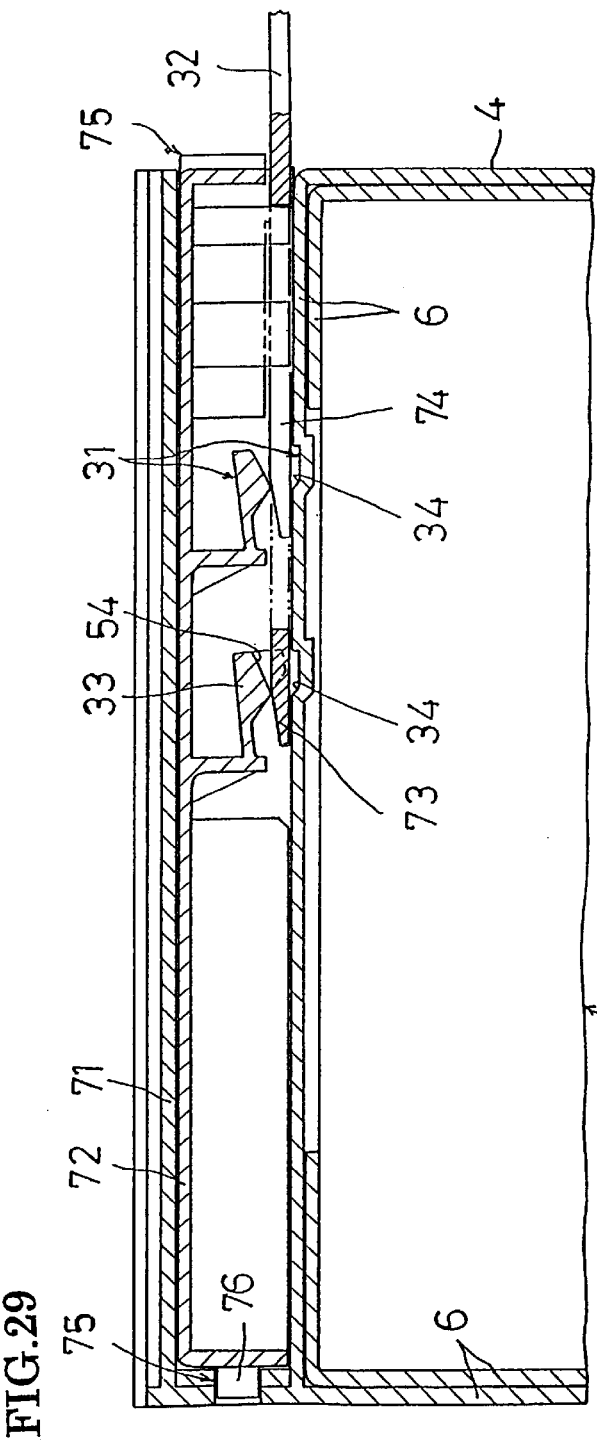
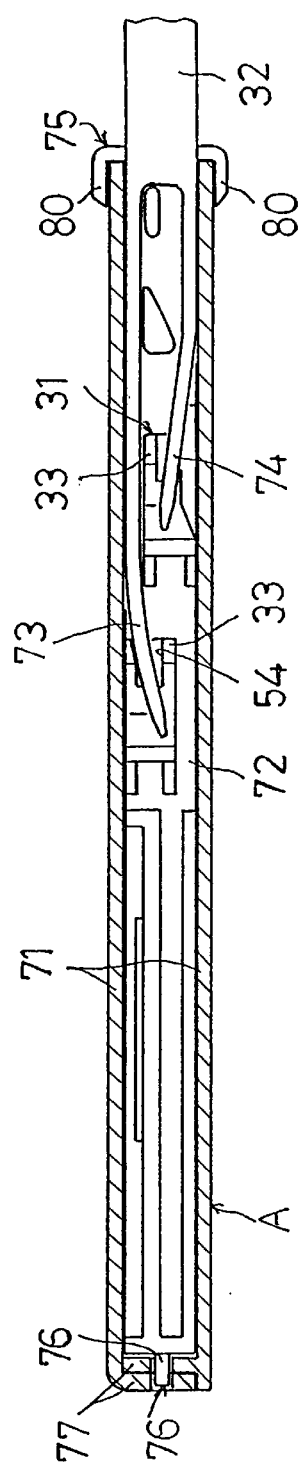

FIG.38
FIG.39
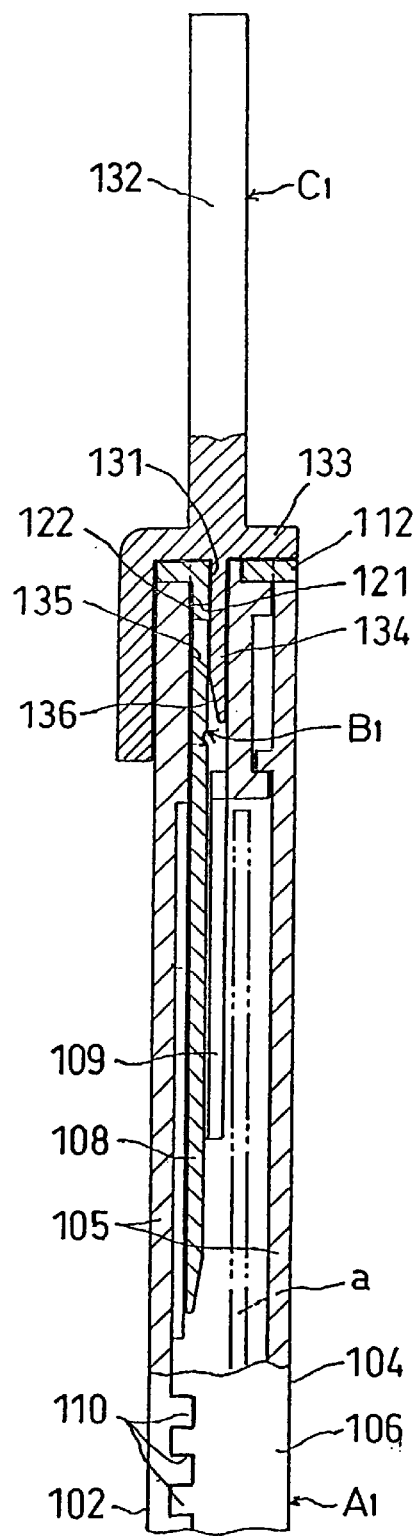
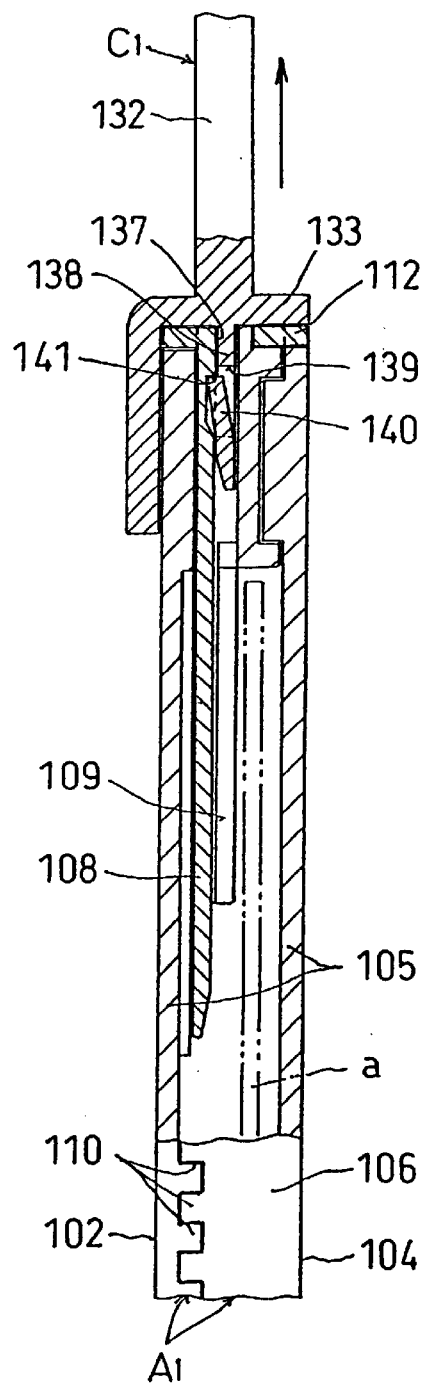

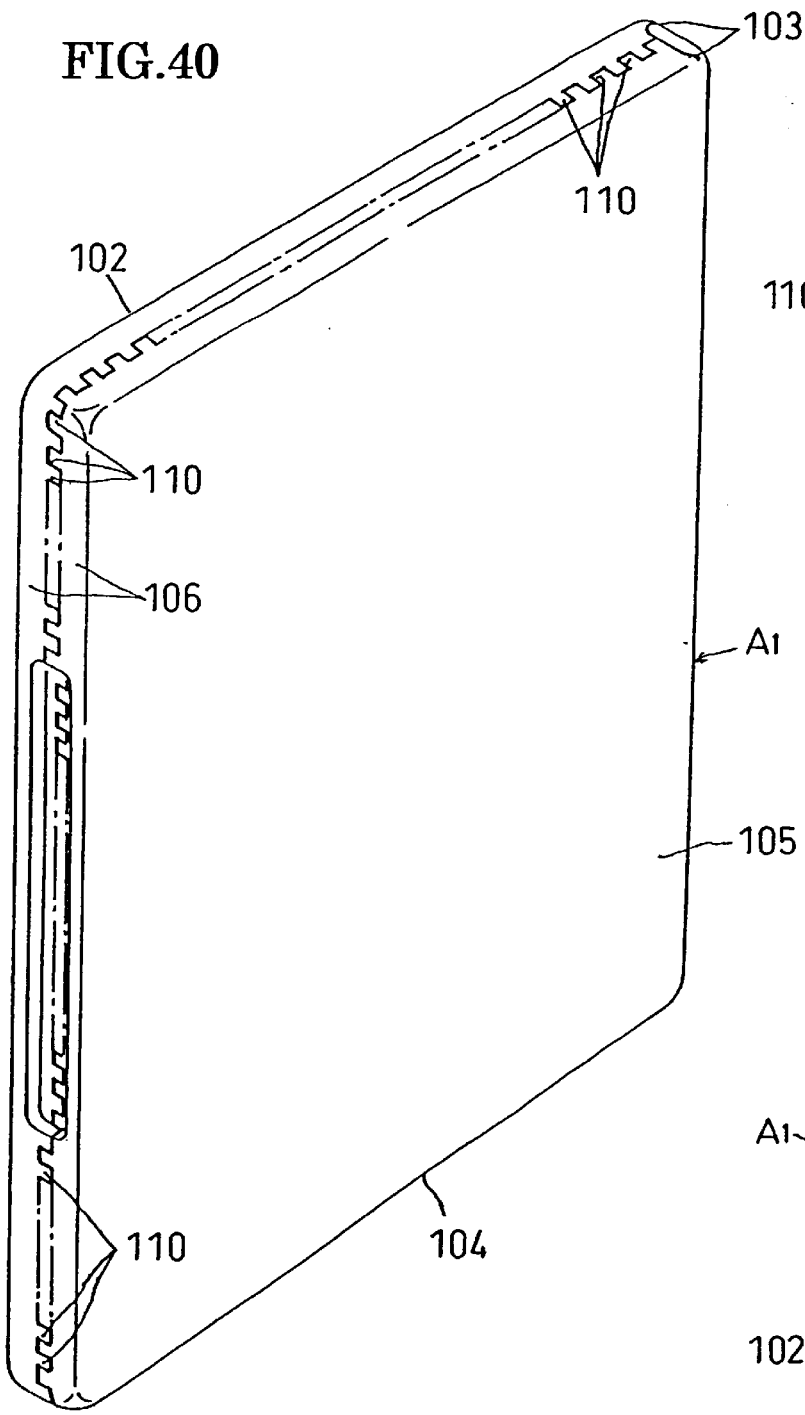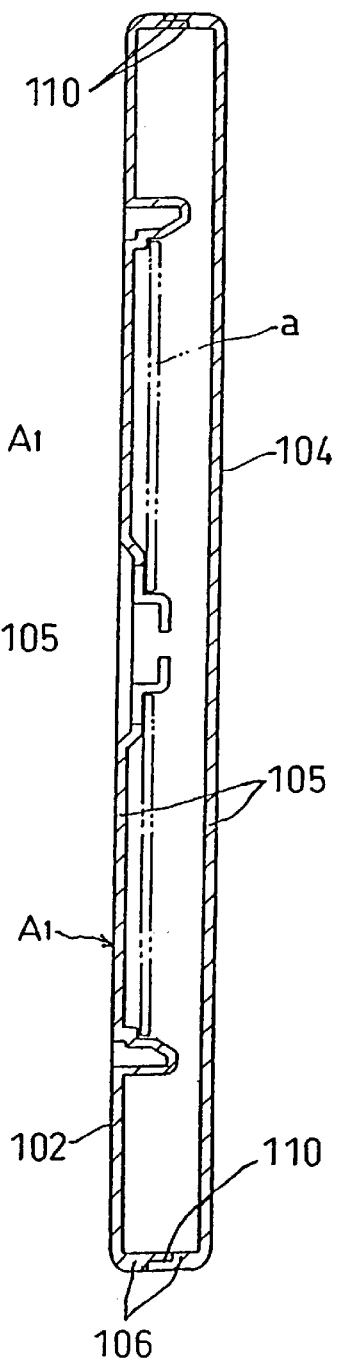

COMMODITY ANTITHEFT IMPLEMENT

This application is a Divisional application of Ser. No. 09/867,568 filed May 31, 2001, now abandoned.

BACKGROUND OF THE INVENTION

1. Field of the Invention

The present invention relates to a commodity antitheft implement for preventing pilferage of commodities for rent such as disks, videotapes or game software recorded with music or images of CD cassettes, or pilferage of various commodities for sale that are accumulated in cases, for preventing these commodities including their cases from being taken outside of the store without permission, and for preventing theft of various commodities for sale stored in such cases.

2. Description of the Prior Art

There exists a problem in, for instance, rental stores that pilferage and theft of commodities for rent cannot be prevented when displaying cases in which the commodities for rent are being actually stored on shelves of the stores since conventional cases are not provided with means for preventing opening thereof.

Thus, a method is used in which empty cases are arranged and displayed on the shelves of the rental store. When a customer takes a displayed empty case of a commodity for rent bearing a title of his or her wish off of the shelf and brings it to the counter, a salesperson standing by the counter will take the corresponding commodity for rent (as indicated on the empty case) out of a storage place. Upon completion of specified lending procedures, the customer may rent the commodity.

Employing such a method prevents theft of commodities for rent since the customer will not directly touch the actual commodity for rent until lending procedures are completed. However, it is troublesome for the salesperson to select commodities for rent from the storage place or to maintain these commodities in a tidy manner. Thus, such a method is disadvantageous in that it is difficult to smoothly perform lending procedures and in that a wide storage place is required.

On the other hand, it would be possible to solve such a problem by displaying cases storing therein commodities for rent on shelves of the rental store, and performing lending procedures when a customer takes a commodity for rent of his or her wish out of one of the cases and brings it to the counter. However, theft cannot be prevented since the customer may directly touch the commodities for rent and take them out of the store without permission.

Some rental stores are now preventing theft of commodities for rent by attaching antitheft tags with particular ID codes to arbitrary positions of the commodities for rent. A predetermined high frequency electromagnetic field is then generated in a gateway of the store, and when one tries to take a commodity for rent out without permission and passes through the gateway, such an unauthorized pass of the commodity for rent may be detected upon resonance of a resonance circuit of the ID code to generate a particular ID code, and detection thereof upon demodulation through the high frequency electromagnetic field that the salesperson may observe. Such a method is, however, disadvantageous in that commodities for rent of which predetermined lending procedures have been completed will be detected similar to those taken out without permission unless such ID codes of the antitheft tags are shielded in some way when performing lending processes at the counter. Thus, this method results in a drawback of troublesome shielding procedures and a remarkable increase in costs due to equipment accompanying the shielding.

Problems are not limited to the above-described cases with commodities for rent, but will also arise when employing antitheft tags for preventing theft of various commodities for sale such as clothing, accessories or daily necessities.

Theft of commodities that are stored in cases comprised, for instance, of a box body and a cover body for opening and closing an aperture of the box body frequently occurs since it is easy to conduct pilferage of the commodities due to the openable arrangement. Even if cases provided with opening-preventing key members or sliders are employed, it is still possible to open the cases since corresponding portions that are latched with the key members or sliders could be broken or released by applying force in a direction for opening the case.

It is therefore an object of the present invention to provide a commodity antitheft implement capable of preventing the opening of the cases for eliminating pilferage of commodities for rent or of objects of which theft shall be prevented, and capable of eliminating the necessity of providing shields by leaving tags for preventing unauthorized removal of commodities within the store, wherein cases may not be opened even upon application of force in a direction for opening the cases.

These and other objects and features of the present invention will be understood in details from the following descriptions with reference to the accompanying drawings illustrating examples thereof.

BRIEF DESCRIPTION OF THE DRAWINGS

FIG. 4 is a plan view illustrating examples of through holes;

FIG. 5 is a longitudinal sectional side view illustrating an example of a through hole;

FIG. 6 is a longitudinal sectional side view illustrating another example of a through hole;

FIG. 7 is a longitudinal sectional side view illustrating a stopper of a key member;

FIG. 11 is a longitudinal sectional front view illustrating principal parts of the implement of the above embodiment;

FIG. 12 is a longitudinal sectional front view illustrating a condition for use of the above implement;

FIG. 16 is a partially cut away front view illustrating a releasing tool being inserted therein;

FIG. 17 is a longitudinal sectional side view of FIG. 16;

FIG. 29 is a longitudinal sectional front view with a releasing tool being inserted therein;

FIG. 30 is a vertically cut away bottom view of FIG. 29;

FIG. 38 is a longitudinal sectional side view of FIG. 37;

FIG. 39 is another longitudinal sectional side view of FIG. 37;

FIG. 40 is a perspective view illustrating a ninth embodiment;

FIG. 41 is a longitudinal sectional side view of FIG. 40;

DETAILED DESCRIPTION OF THE PREFERRED EMBODIMENTS

Figure 1:
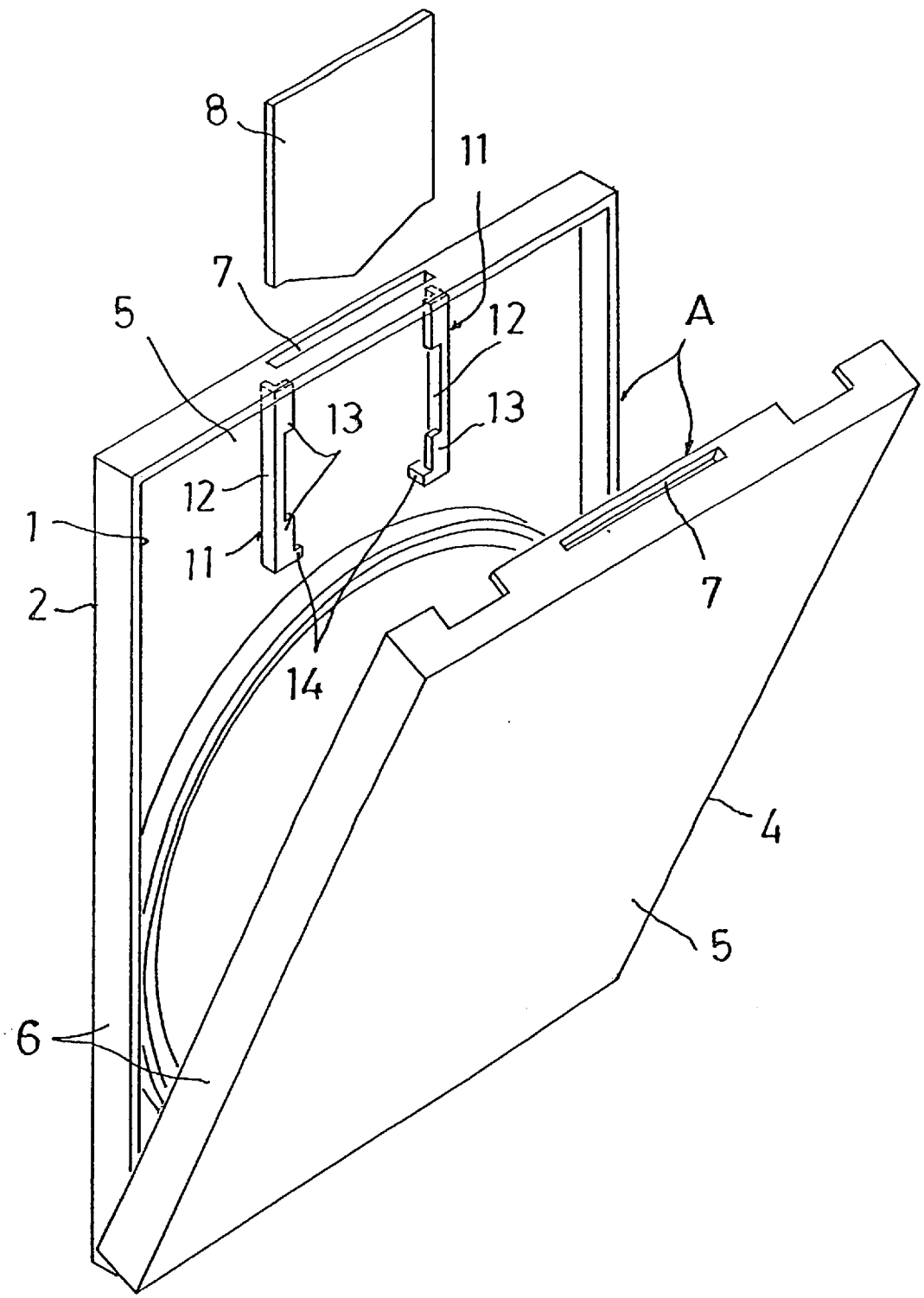
FIG. 1 is a perspective view illustrating first and second embodiments of the present invention.
Figure 2:
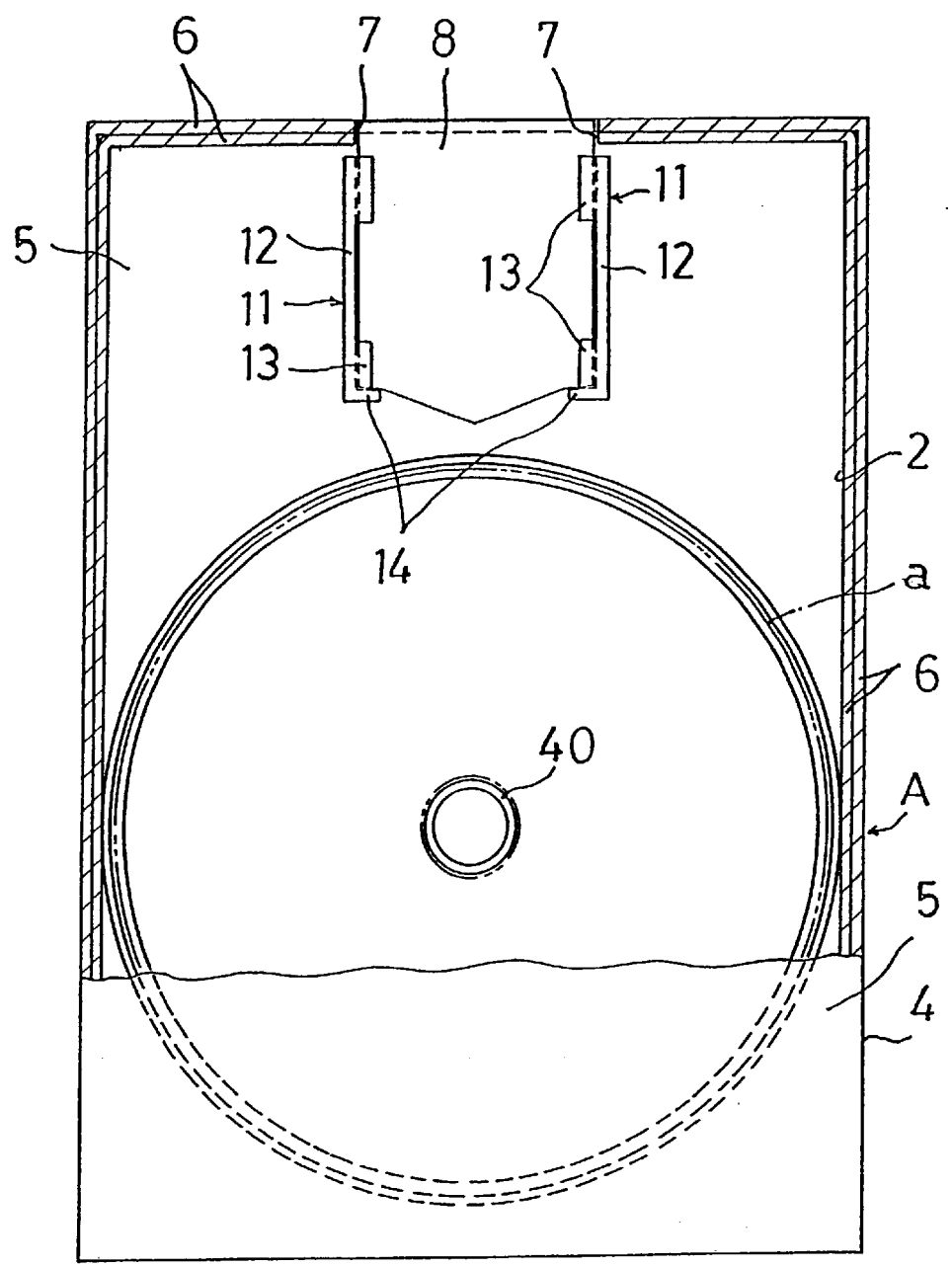
FIG. 2 is a partially cut away front view of FIG. 1.
Figure 3:
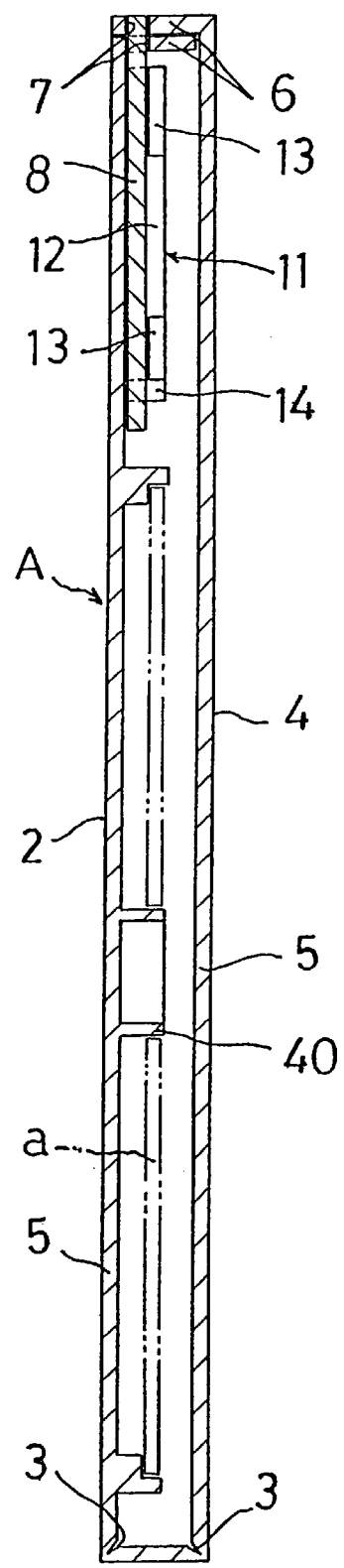
FIG. 3 is a longitudinal sectional side view of FIG. 1.

FIGS. 1 to 3 illustrate a first embodiment of the commodity antitheft implement.

Case A according to the first embodiment is comprised of a shallow rectangular box body 2 storing a commodity in the interior thereof and having an opening portion 1 for taking the commodity a in and out, and a cover body 4 connected to the box body 2 through hinges 3 and arranged to open and close the opening portion 1.

The box body 2 is formed with peripheral walls 6 provided on four peripheral edges of a square main wall 5 while the cover body 4 is formed with peripheral walls 6 provided on three peripheral edges of its square main wall 5. By uniformly forming a lower edge of the main wall 5 to a lower peripheral wall of the box body 2, the box body 2 and the cover body 4 are uniformly molded by using synthetic resin.

As illustrated in FIG. 3, the hinges 3 are subjected to half-cut finishing at corner portions between a lower edge and the lower peripheral portion of the main wall 5 of the box body 2, as well as at corner portions between the lower edge and a lower peripheral portion of the main wall 5 of the cover body 4. The cover body 4 is thus made bendable with respect to the box body 2 from a flat, fully opened condition to a closed condition in which the opening portion 1 is closed.

When the opening portion 1 of the box body 2 is closed by the cover body 4, the peripheral walls 6 of the cover body 4 will outwardly fit with the peripheral walls 6 of the box body 2.

The peripheral walls 6, 6 of both the box body 2 and the cover body 4 are provided with through holes 7, 7 that coincide so as to form an insertion port (as shown in FIGS. 2 and 3) when key member 8 is inserted into these coincident through holes after the box body 2 is closed by the cover body 4. The key member 8 is inserted into holes 7, 7 (insertion port) from outside such that it may freely be inserted and drawn out.

By inserting the key member 8 into the through holes 7, 7, the closed condition of the cover body 4 with respect to the box body 2 can be maintained. By drawing the key member 8 out, the cover body 4 may assume an open position.

It should be noted that the structure of each of the above hinges 3 is not limited to the illustrated one. It is alternatively possible to employ a structure in which opening and closing is affected by, for instance, separately provided hinges or pin hinges of a style in which holes and projecting shafts are fitted with each other. In addition, the key member 8 is not limited to the illustrated plate-like body, and may also comprise a square shaft or cylindrical shaft.

It will also be understood that while the illustrated through holes 7 are formed as elongated holes that coincide with the peripheral shape of the plate-like body of the plate-like key member 8, these holes may be alternatively formed to meet any peripheral shape of the key member 8. The shape of the through holes 7 may also be formed so that they engage with both side edge portions of the key member 8 as illustrated in FIG. 4. The crucial point is that opening of the cover body 4 with respect to the box body 2 shall be prevented by inserting the key member 8 into the coincident through holes 7, 7.

While the positions of the through holes 7, 7 are located at central portions on upper sides of the peripheral walls 6, 6 so as to oppose the illustrated hinges 3, they may also be formed on both end portions on upper sides or on both sides of the peripheral walls 6, 6, depending on sizes or other reasons.

It is also possible to provide, in addition to the inner and outer overlapping peripheral walls 6, 6, formed with coincident through holes 7, 7, projecting walls 9 may be formed to extend from either or both main walls 5 in a parallel manner so as to oppose the peripheral walls 6 as illustrated in FIG. 5. By forming through holes 7 on these projecting walls 9 that coincide with the through holes 7 of the peripheral walls 6, 6, the key member 8 may be inserted into through holes 7 of both, the peripheral walls 6 and the projecting walls 9. It should be noted that a distal end of the inserted key member may be hidden if L-shaped bent walls 10, 10 are provided outside of the peripheral walls 6 and are formed with the through holes 7 to extend from side edges of both main walls 5, 5 such that the key member 8 may be inserted into the through holes 7 between the bent walls 10, 10.

The provision of a guide 11 within the case A for guiding the key member 8 when inserted will enable smooth insertion of the key member 8 through the through holes 7. The illustrated guide 11 includes rail strings 12 for guiding both side edges of the key member 8 formed on an inner surface of the main wall 5 on the box body 2 side, and includes slip-off preventing strings 13 projecting out from the rail strings 12 with respect to the main walls 5 while forming a clearance that is somewhat larger than a thickness of the key member 8 and which faces plate surfaces of side edge portions of the key member 8. However, it is alternatively possible to provide the guide 11 on the main wall 5 on the cover body 4 side. The shape of the guide is also not limited to the structure comprised of the rail strings 12 and the slip-off preventing strings 13, and may be formed to assume different shapes (e.g., a cylindrical body).

Stoppers 14 are provided at ends of the rail strings 12 which both sides of the leading edge of the key member 8 abut such that the distal edge of the inserted key member 8 and the surface of the outer peripheral wall 6 are formed within the same plane. In other words, as illustrated in the Figures (particularly FIG. 2), the key member is entirely inserted into the case 2, 4. In this regard, the term "entirely inserted" means that substantially no portion of key member 8 extends beyond the periphery of case 2, 4, as illustrated in FIG. 2.

The stoppers 14 may be arranged in a manner other than being formed on the rail strings 12. For instance, they may be formed as protrusions on an inner surface of the main wall 5 or arranged so that a brim 15 is formed at a distal end of the key member 8 as illustrated in FIG. 7. The brim 15 is fitted into a concave portion 16 formed on the surface of the outer peripheral wall 6 so that the surface of the brim 15 is formed on the same plane as the surface of the peripheral wall 6 for the purpose of hiding the key member 8.

A route for inserting the key member 8 may be established by the guide 11 so that the key member 8 will not contact the commodity stored in the case A even if the commodity is unwrapped. Consequently, it is possible to eliminate the occurrence of a case in which the commodity a is damaged through contact between the key member 8 and the unwrapped commodity a.

It is thus possible to eliminate damage to recorded surfaces or printed surfaces even if the commodities in question are unwrapped disks, to decrease costs since it is possible to leave commodities unwrapped, and to further eliminate damage to accessories by the key member 8 if accessories, such as song texts, are accumulated within the case A.

Figure 8:
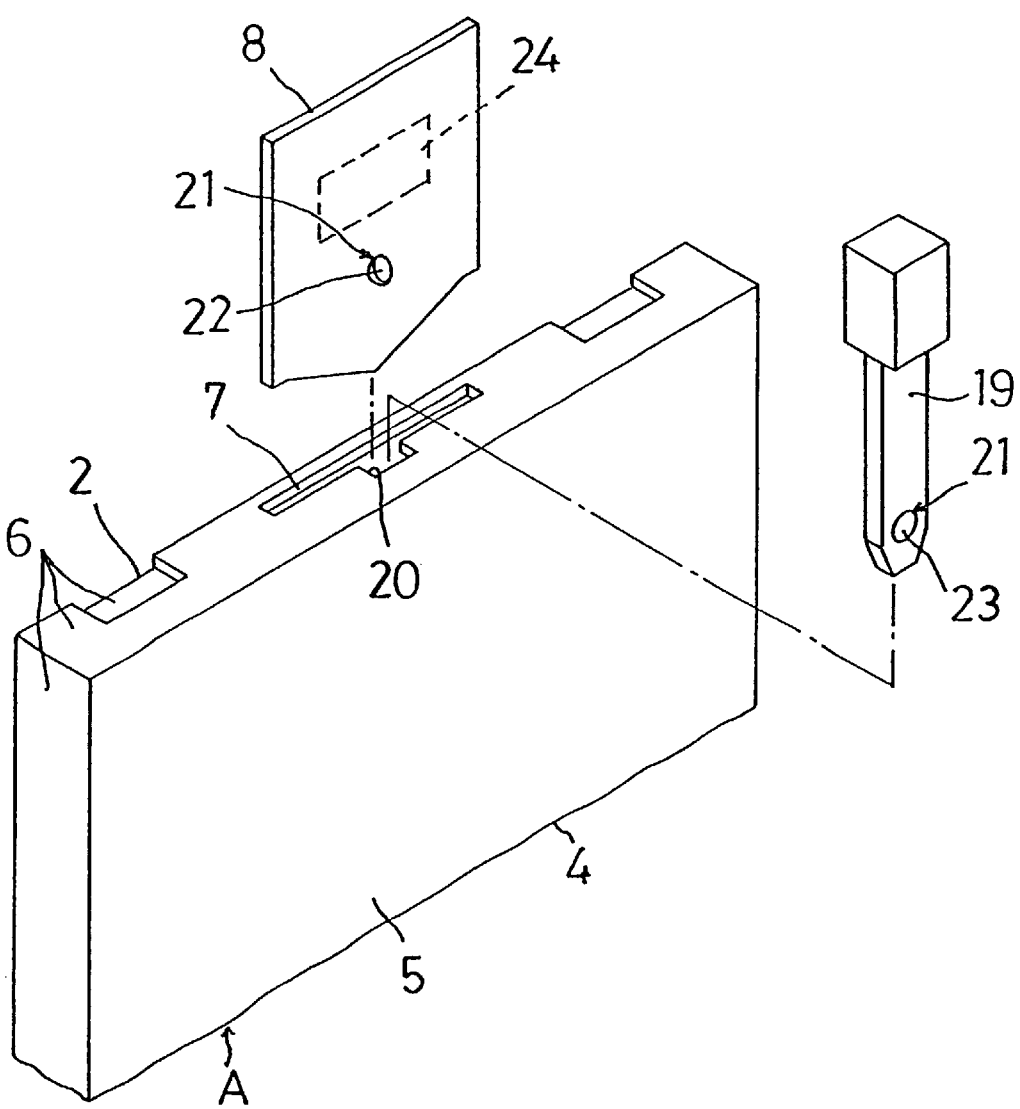
FIG. 8 is a perspective view illustrating a third embodiment.
Figure 9:
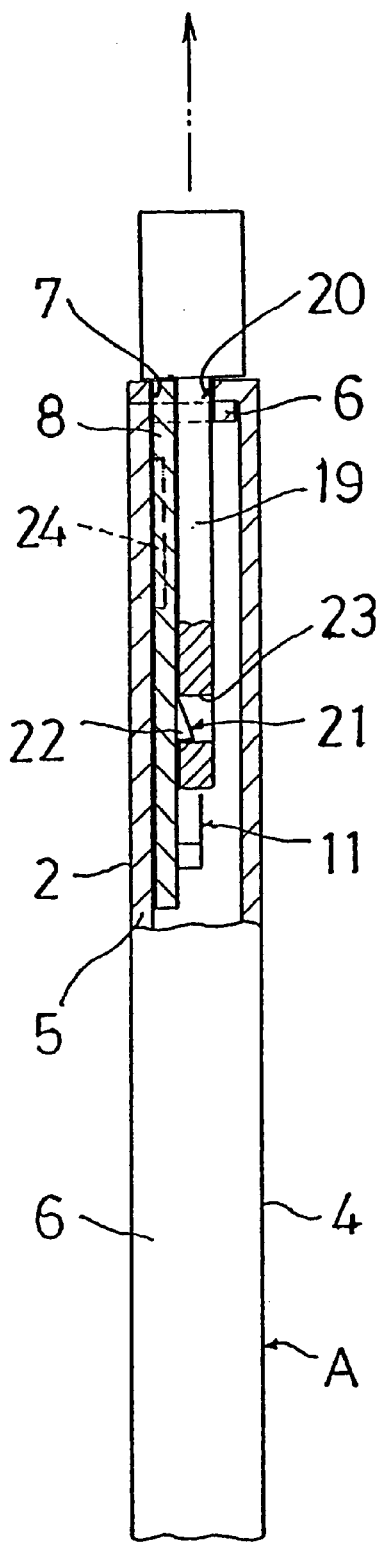
FIG. 9 is a longitudinal sectional side view illustrating an example using the implement of the above embodiment.
Figure 10:
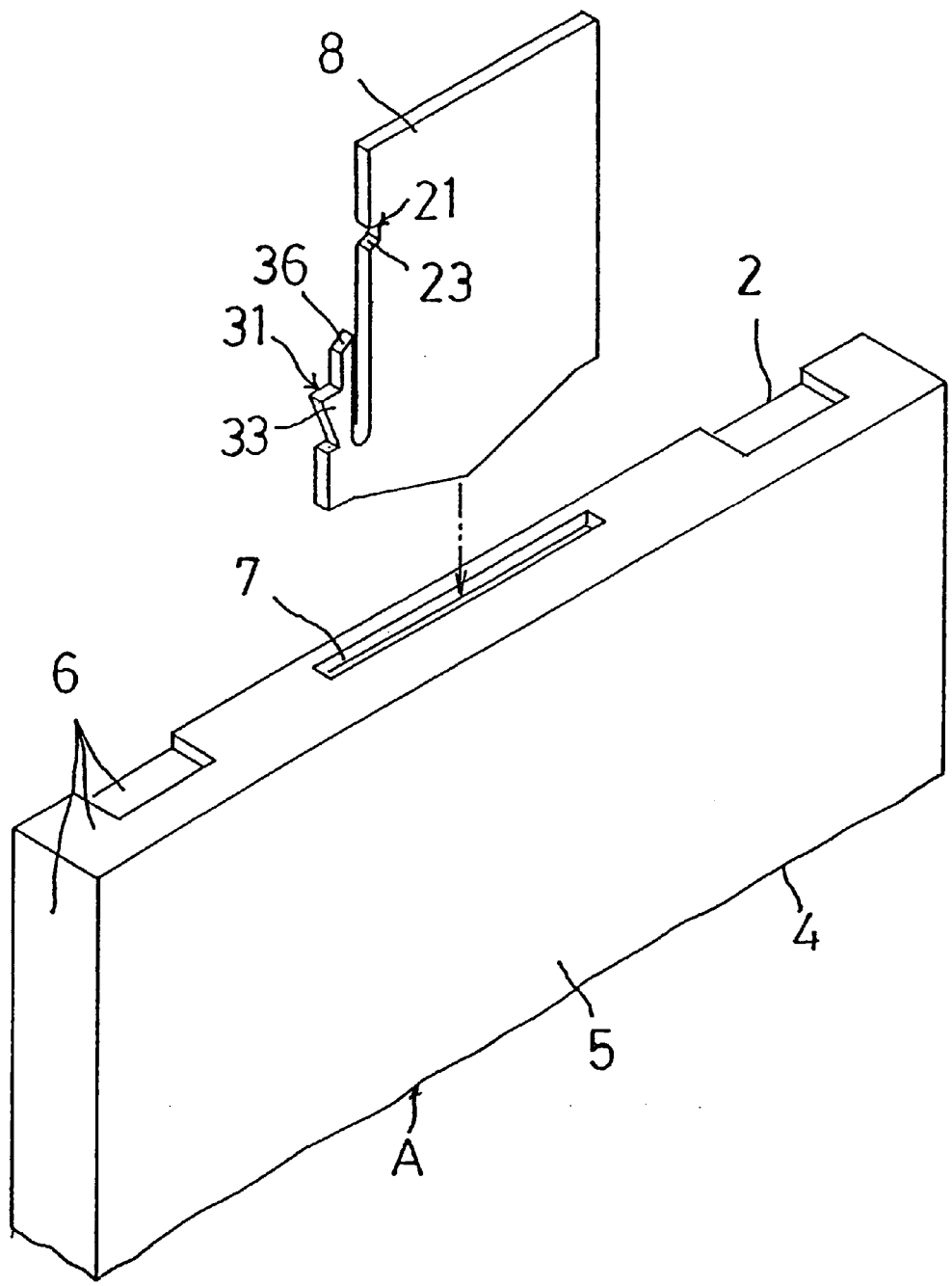
FIG. 10 is a perspective view illustrating a fourth embodiment.

The commodity antitheft implement according to the second embodiment of the present invention as illustrated in FIGS. 8 and 9 is arranged so that a key member 8 that is inserted into case A is drawn out within the store. As illustrated in FIGS. 8 and 9, a notch 20 is formed as an aperture for inserting a drawing tool 19, and a pair of latch portions (forming a fitting member) 21 are formed on opposing surfaces or opposing edges of the drawing tool 19 and the inserted key member 8. The illustrated fitting member 21 is comprised of a protrusion 22 as one latch portion and of a hole 23 as the other latch portion into which the protrusion 22 is fitted to and latched with. Upon coincidence of the hole 23 and the protrusion 22 through the insertion of the drawing tool 19, the protrusion 22 will fit into the hole 23 to assume a latched condition. By drawing the drawing tool 19 out after establishing the latched condition, the key member 8 will be simultaneously drawn out to thereby enable opening of the case A. The drawing tool 19 and the key member 8 that have been drawn out will be left in the store for reuse. Thus, a case A that is not provided with a key member 8 will be a case for sale or rent in case of a rental store. It should be noted that while the hole 23 is formed at the drawing tool 19 and the protrusion 22 at the key member 8 in the illustrated example, it is possible to employ an arrangement in reverse.

Smooth insertion of the drawing tool 19 is enabled if a tapered surface portion with its degree of projection increasing in approaching a leading direction of insertion is formed on an end surface in a projecting direction of the protrusion 22, as illustrated.

The commodity antitheft implement according to the third embodiment is arranged so that an antitheft tag 24 is provided at the key member 8 of the above-described first and second embodiments through adhesion or embedding.

As illustrated in FIGS. 8 and 9 for exemplary purposes, the tag 24 is comprised of a known particular ID code. When one tries to take a case A with the key member 8 inserted therein and having the tag 24 through a gateway of a store, such an unauthorized pass of the case A may be detected upon resonance of a resonance circuit of the ID code provided at the gateway of the store to generate a particular ID code. Detection of the ID code upon demodulation through the high frequency electromagnetic field allows the salesperson to observe the removal, and consequently prevent theft. However, after purchase or rental, the key member 8 with the tag 24 is of course drawn out and left in the store, and the case A storing therein an unwrapped commodity a is used as a case for sales or rent. Prior to selling or lending, it is possible to block the opening of the case A through the key member 8, and to effectively prevent shoplifting or theft of an unwrapped commodity a through the tag 24.

The commodity antitheft implement according to the fourth embodiment of the present invention is comprised, as illustrated in FIGS. 10 to 13, with a key member 8 that is inserted into case A similar to the first embodiment. An engaging portion 31 is formed on the key member 8 and can assume an engaged relationship with case A upon insertion of the key member 8. This engaged relationship may be released by inserting a releasing tool 32 that is inserted into the case A.

The illustrated engaging portion 31 includes an engaging claw 33 formed at a side edge of the key member 8 such that its degree of projection becomes gradually larger in approaching a distal end (i.e., an end to be located at upper peripheral wall 6 when inserted) of the key member 8. An engaging hole 34 into which the engaging claw 33 fits and engages is formed at a midway location of a rail string 12 of the guide 11, and the engagement of claw 33 in engaging hole 34 prevents the key member 8 from being drawn out. When the engaging claw 33 contacts the rail string upon insertion of the key member 8, the engaging claw 33 will be pushed back (i.e., toward the main body of key member 8). Upon completion of insertion of the key member 8, the engaging claw 33 and the engaging hole 34 will coincide (i.e., the engaging claw 33 fits inside engaging hole 34) such that the rail string 12 and the engaging claw 33 will not contact with each other (except to prevent removal of key member 8). Consequently, when the engaging claw 33 is released from the force pushing the claw 33 back, the claw 33 will fit into the engaging hole 34 as illustrated in FIG. 11 to assume an engaged condition for preventing the key member 8 from being drawn out.

Instead of forming the engaging claw 33 and engaging hole 34 at the key member 8 and the guide 11, they may alternatively be formed on an inner surface of the main wall 5 of the box body 2 at a surface at which the key member 8 and the case A oppose each other, or also on an inner surface of the main wall 5 of the cover body 4.

Figure 14:
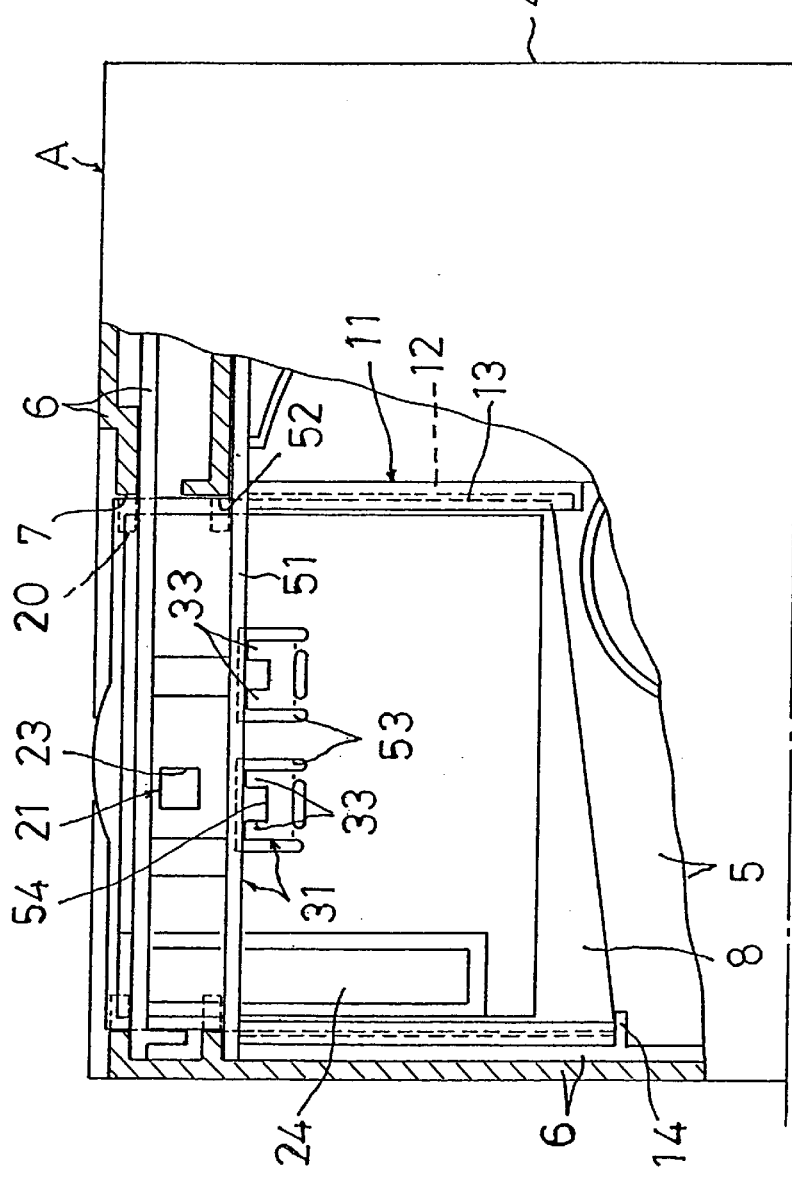
FIG. 14 is a partially cut away front view illustrating another example of an engagement means.
Figure 18:
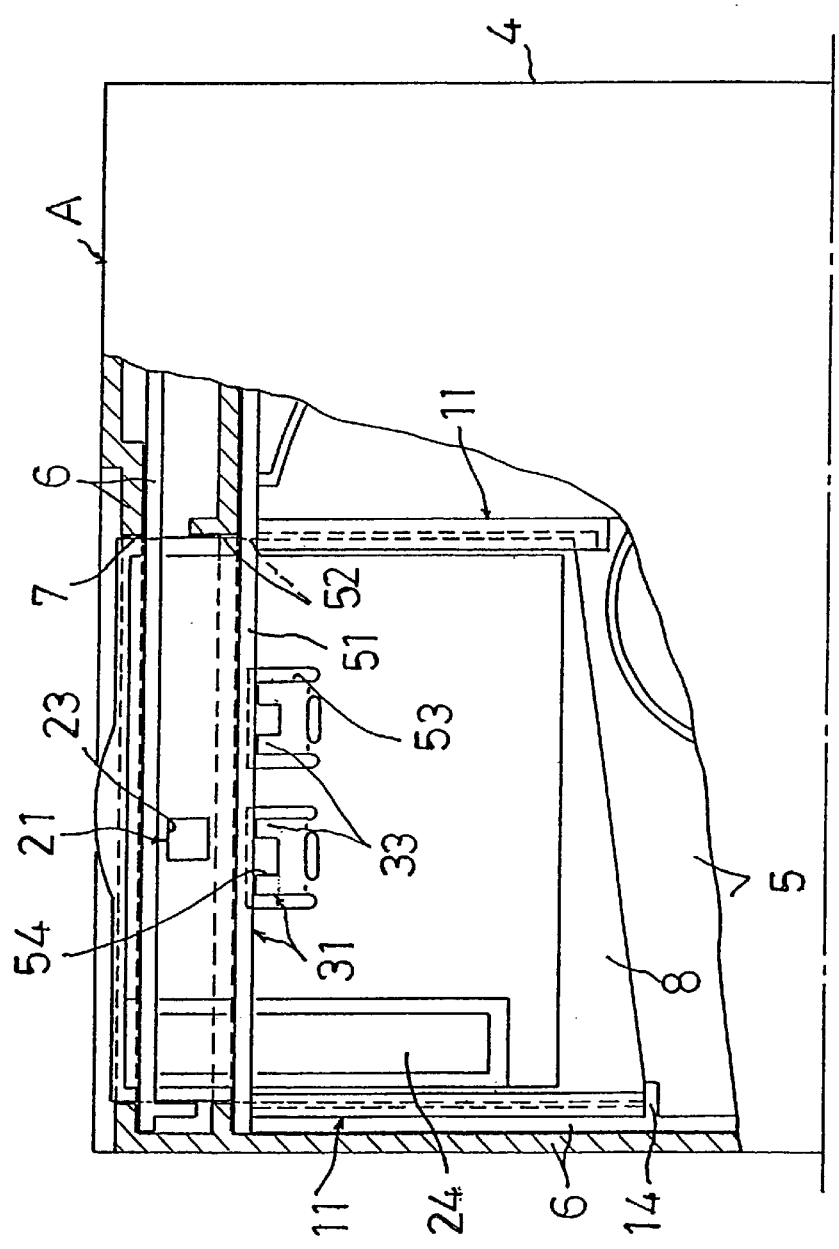
FIG. 18 is a partially cut away front view illustrating a key member being inserted therein.

In such a case, the engaging hole 34 from among the engaging claw 33 and the engaging hole 34 comprising the engaging portion 31 may be replaced by a projecting portion 51 such as a projecting string or a protrusion projecting out from the inner surface of the main wall 5 of at least either one of the box body 2 or the cover body 4, as illustrated. The engaging claw 33 of key member 8 contacts the projecting portion 51 halfway through insertion of the key member 8 to push the engaging claw 33 back through this contact. The engaging claw 33 that is released of force pushing the same back will return (spring back) when the engaging claw 33 has completed passing the projecting portion 51 while a tip of the returned engaging claw 33 will hook at the projecting portion 51 for preventing the key member 8 from being drawn out. It should be noted that if the projecting portion 51 is formed as a projecting string as in the illustrated case, a piercing portion 52 for the key member 8 may be formed as a notched through-hole as illustrated in FIG. 14 or FIG. 18.

While the illustrated engaging claw 33 has been formed by cutting a slit 53 formed to substantially assume the shape of the letter U into the plate surface of the key member 8 and pushing the slit 53 out from inside, it is also possible to attach a separately arranged engaging claw to the key member or to uniformly form the same with the key member 8 in a the form of a molded plate made of synthetic resin. The crucial point is that the key member 8 and the case A automatically assume an engaged relationship upon completion of insertion of the key member 8 for preventing the key member 8 from being drawn out.

As illustrated in FIGS. 11 and 12, when the releasing tool 32 is inserted through the through holes 7 serving as inserting apertures towards the engaging claw 33, a tapered jutting piece 35 projecting from a tip of the plate-like releasing tool 32 will fit between an outer edge of a projecting piece 36, which projects from the engaging claw 33 toward the distal end of the key member 8, and the rail string 12. When fitting is continued, the engaging claw 33 is pushed toward the main body of key member 8 and released from the engaging hole 34 whereupon the engaged relationship is released.

Accompanying the drawing out of the releasing tool 32, the key member 8 may be drawn out together with the releasing tool 32 through frictional force caused through press-contact of the projecting piece 36 on the jutting piece 35 utilizing resilience of the pushed and released engaging claw 33. It should be noted that if slip is caused at a portion where frictional force is generated, a pair of latch portions 21 comprised of latch protrusion 22 and latch opening 23 similar to those of the second embodiment shall be formed at the key member 8 and the releasing tool 32.

Figure 15:
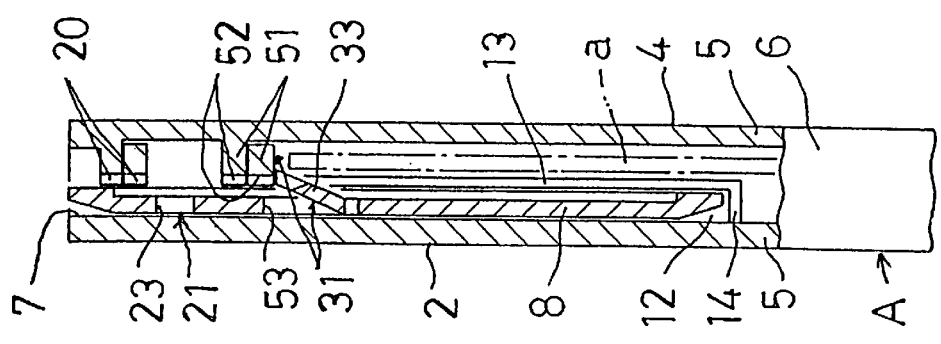
FIG. 15 is a longitudinal sectional side view of FIG. 14.

If an engaging portion 31 is provided on opposing surfaces as illustrated in FIGS. 14 and 15, a notched portion 54 as illustrated in FIGS. 16 and 17 directed inward from a center of the projecting direction of the engaging claw 33 may be provided. The engaged relationship between the engaging claw 33 and the projecting portion 51 may then be released by fitting the jutting piece 35 of the releasing tool 32 (inserted through the notch 20 provided at edges of the through holes 7) into this notched portion 54 and pushing the engaging claw 33 back in the course of fitting operations. The releasing tool 32 and the key member 8 are simultaneously drawn out through latching affected by the fitting of the protrusion 22 and the hole 23 of the latch portion 21 provided on opposing surfaces of the key member 8 and the releasing tool 32. Since the structure and the action of such latch portion 21 is identical to those of the second embodiment, detailed explanations will be omitted.

As described above, the key member 8 that has been drawn out simultaneously with the releasing tool 32 is left in the store while the case A storing therein commodity a may be used as a case for rent or sales. When being displayed, opening of the case A may be prevented by the key member 8 that is inserted into the case A, and the key member 8 is prevented from being drawn out by the engaging portion 31.

Figure 13:
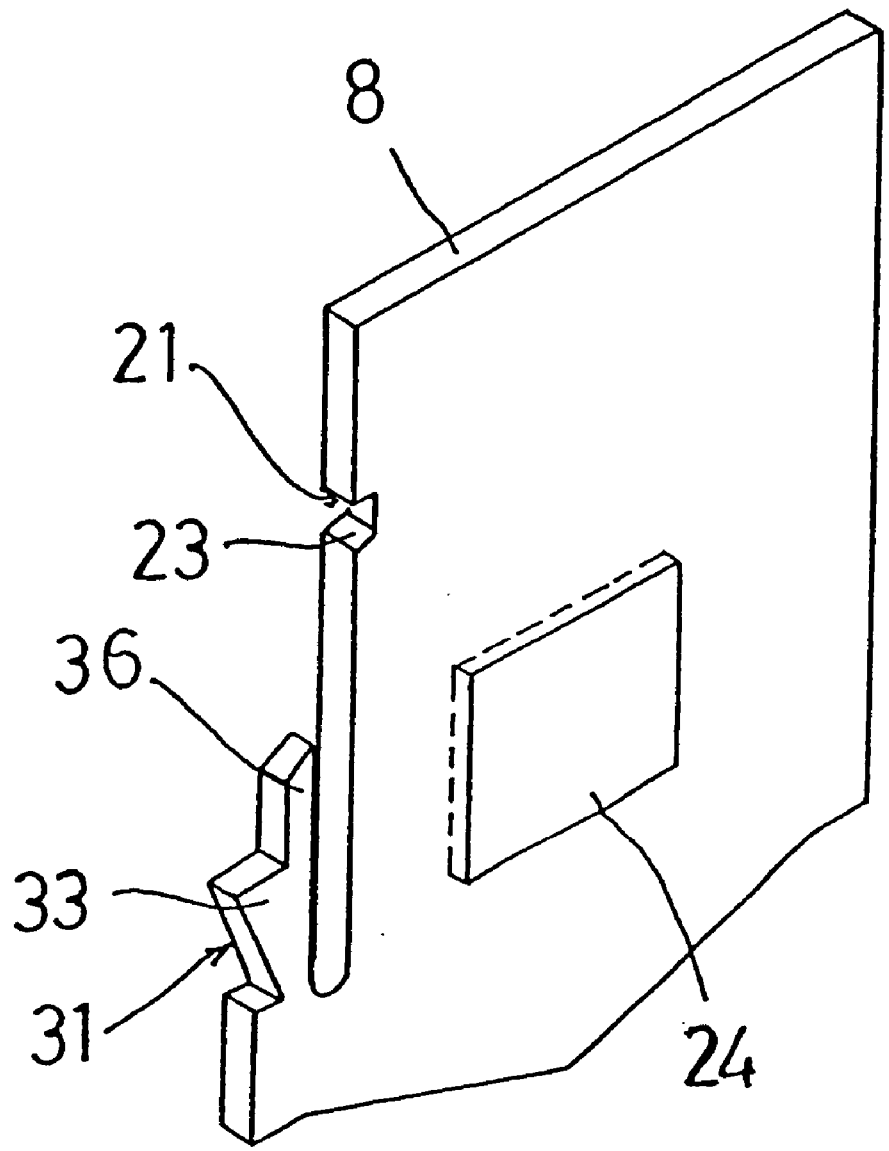
FIG. 13 is a perspective view of a key member.

It is of course possible to attach an antitheft tag 24 to the key member 8 including the engaging portion 31, similar to the third embodiment, as illustrated in FIG. 13.

In the drawing, 39 denotes a through window for pushing and releasing the protrusion formed at the releasing tool 32.

If the unwrapped commodity a stored within the case A is a disk, damage to its printed surface or recorded surface may be prevented by arranging the leading end of the key member 8 that is inserted into the case A so that the leading end stops at a remote position with respect to a peripheral edge of the disk that is temporally supported by a central supporting member 40 such that the key member 8 and the plate surface of the disk do not contact each other as it is illustrated in FIGS. 1 and 2. Such an arrangement omits the necessity of providing the above-described guide means 11.

Figure 19:
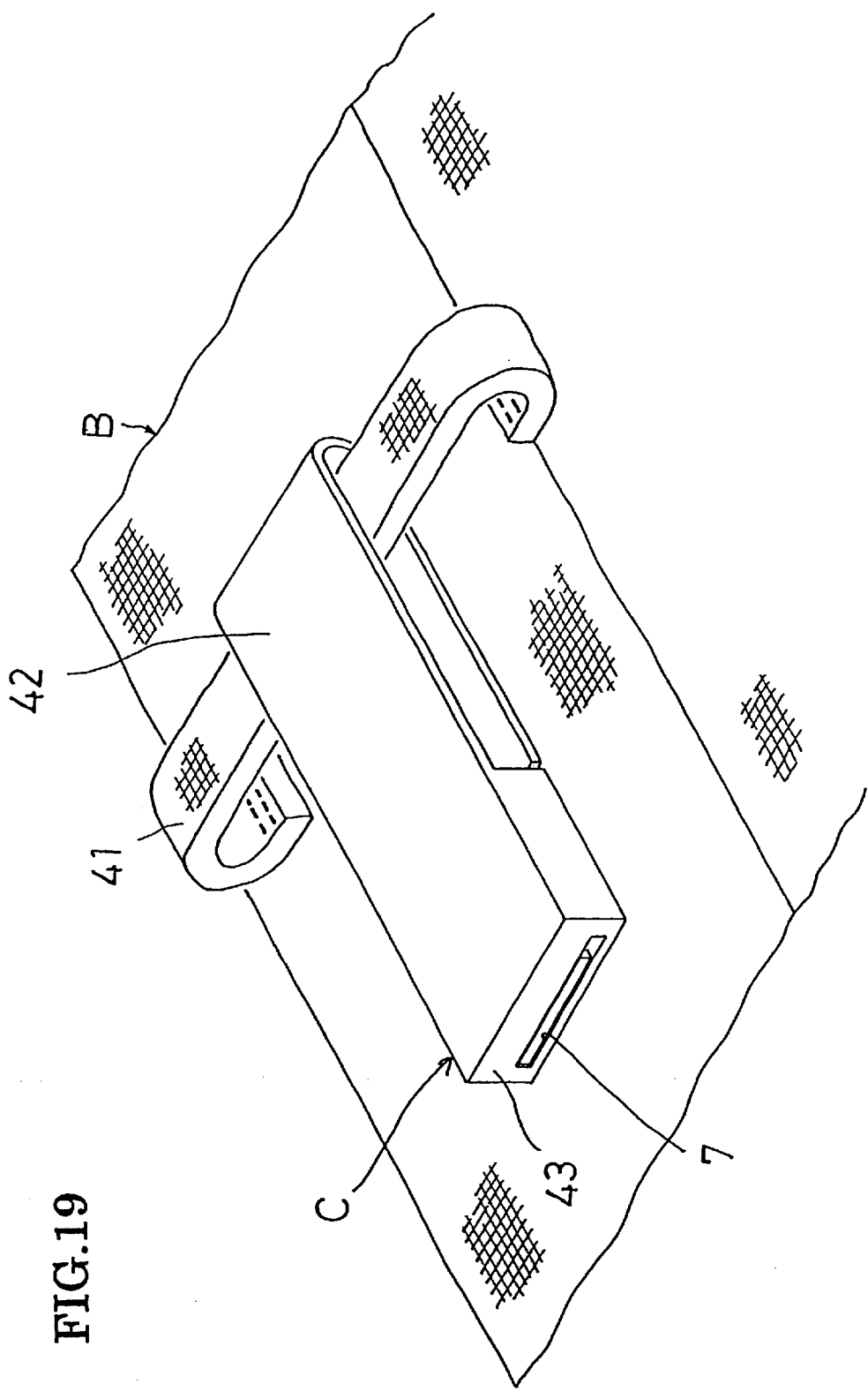
FIG. 19 is a perspective view illustrating a fifth embodiment.
Figure 20:
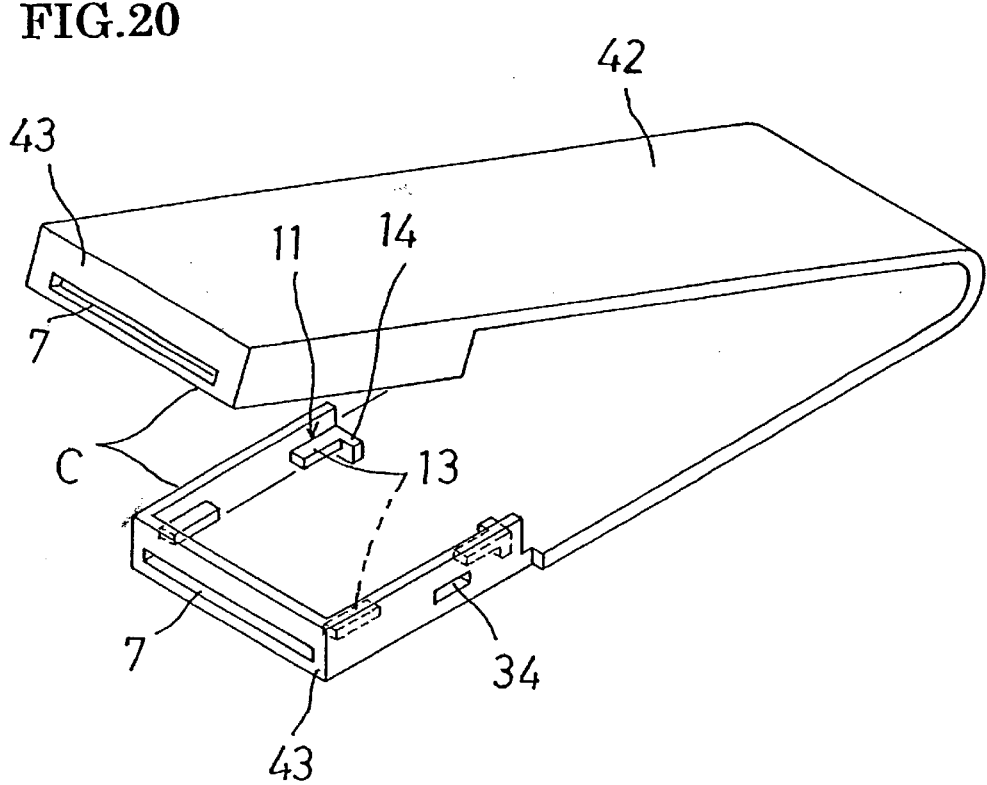
FIG. 20 is a perspective view illustrating principal parts of the implement of the above embodiment.
Figure 21:
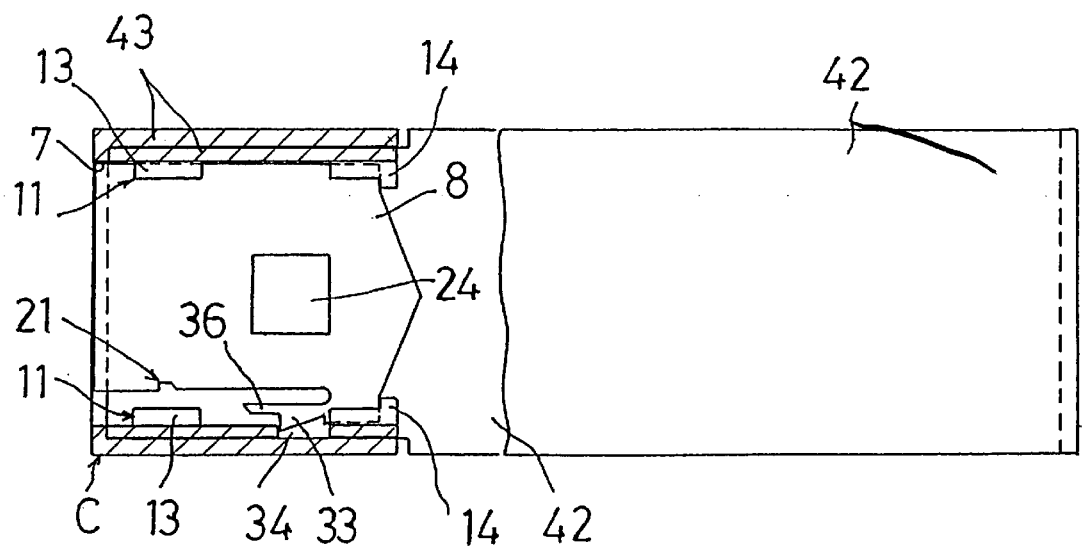
FIG. 21 is a partially cut away plan view of FIG. 20.
Figure 22:
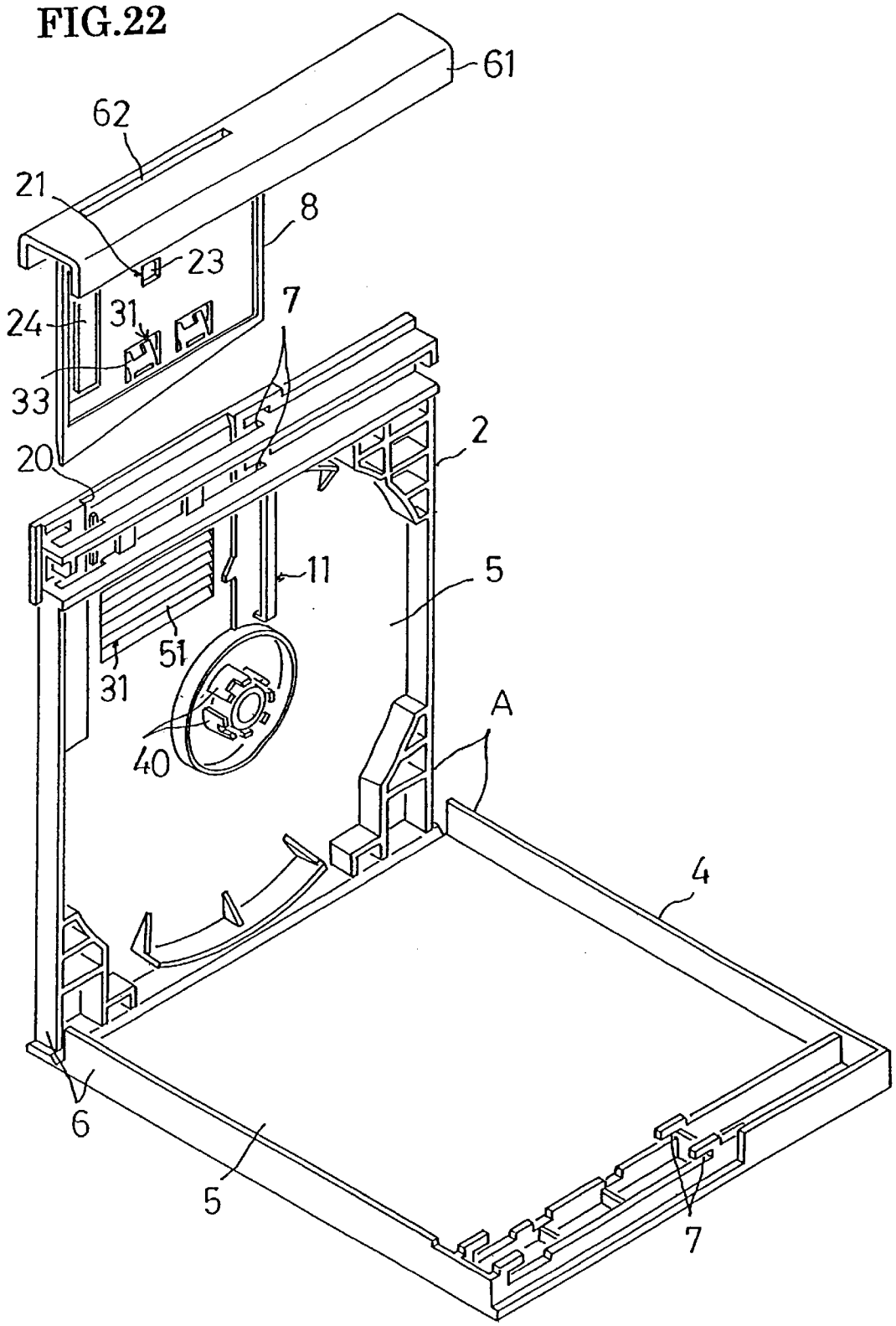
FIG. 22 is a perspective view illustrating a sixth embodiment.
Figure 23:
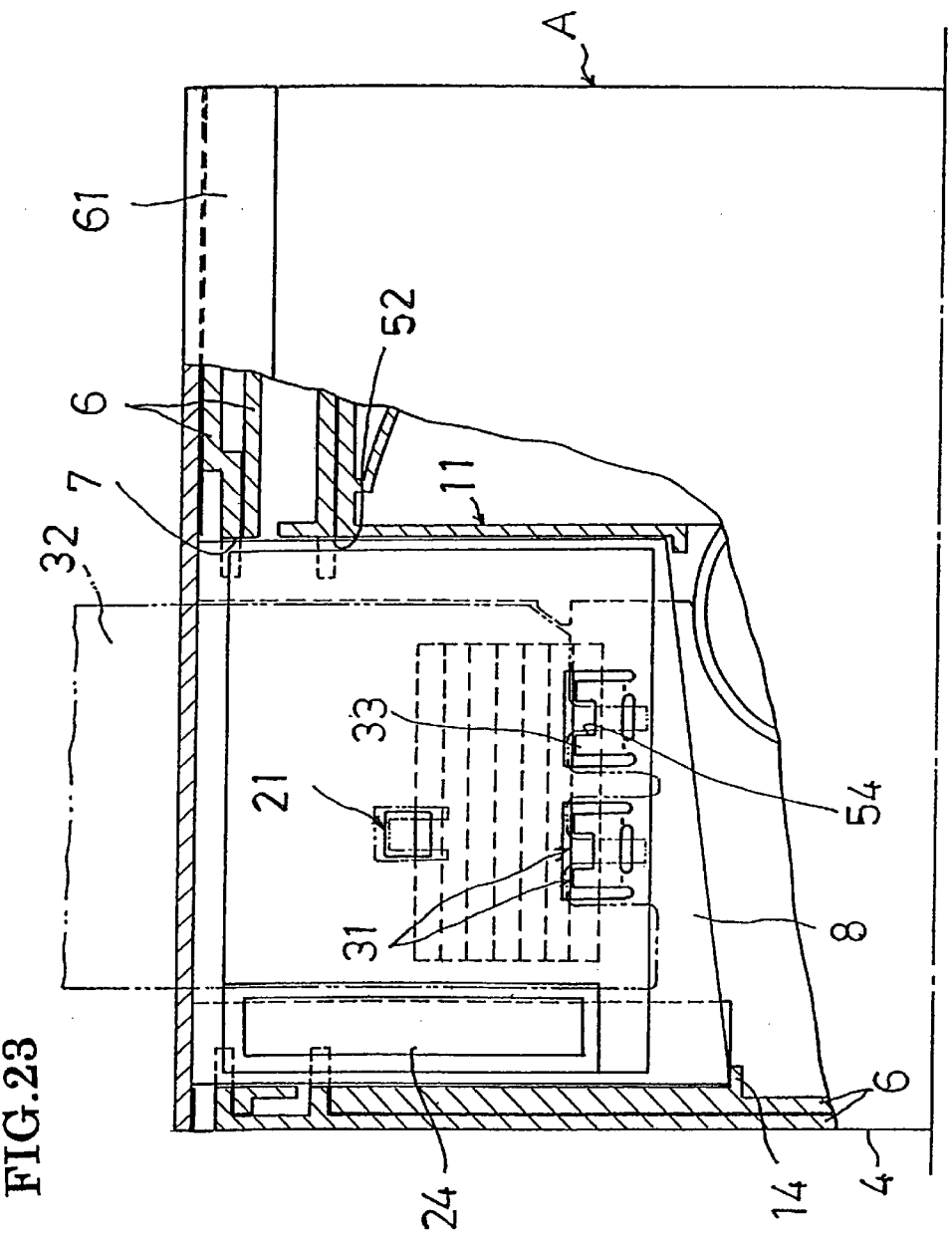
FIG. 23 is a partially cut away front view illustrating a key member being inserted therein.
Figure 24:
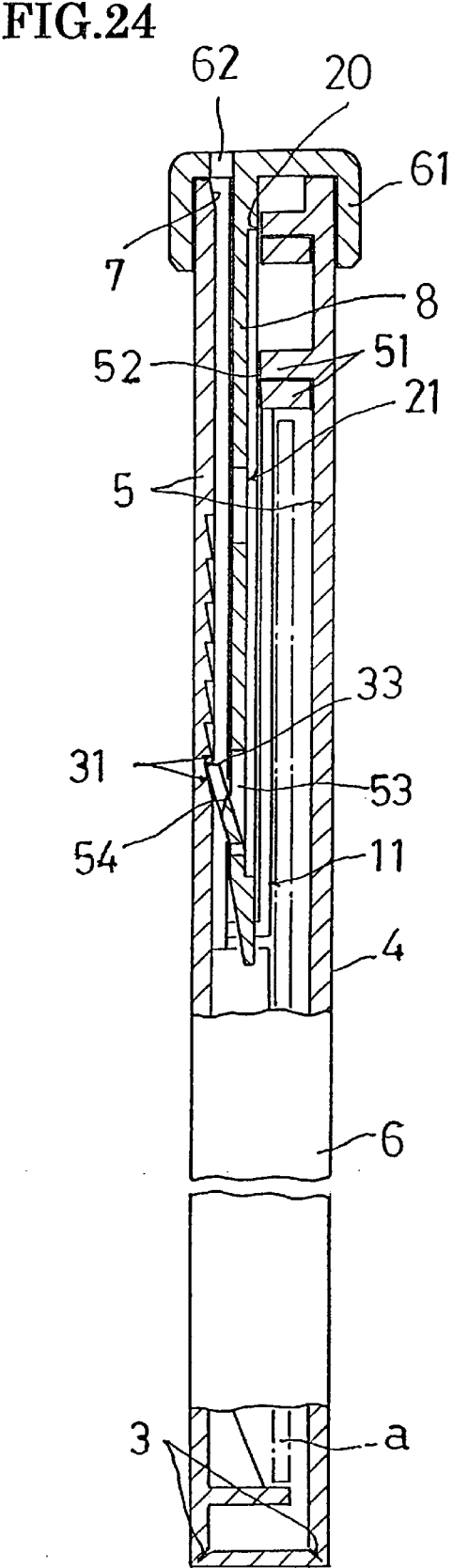
FIG. 24 is a longitudinal sectional side view of FIG. 23.
Figure 25:
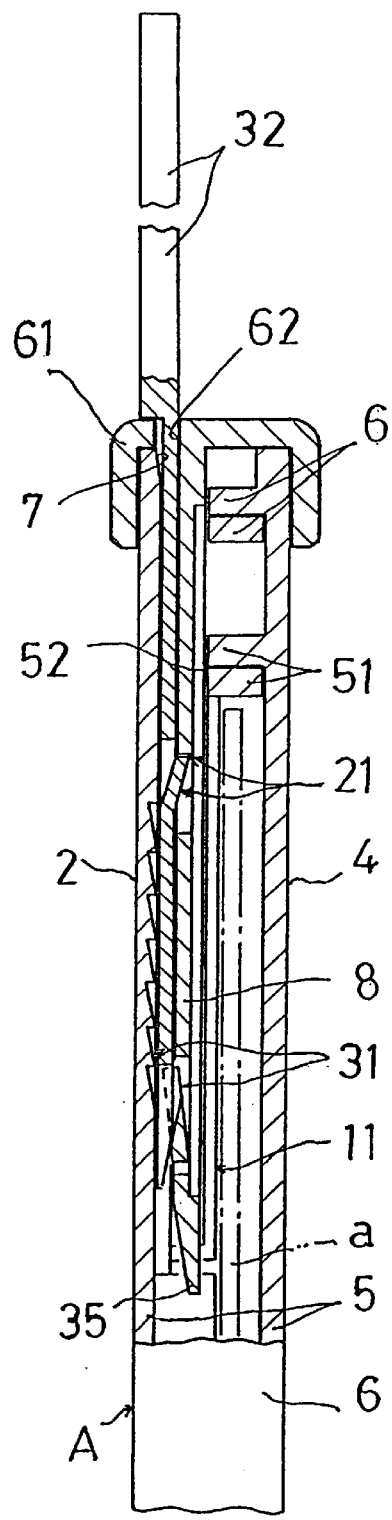
FIG. 25 is a longitudinal sectional side view with a releasing tool being inserted therein.
Figure 26:
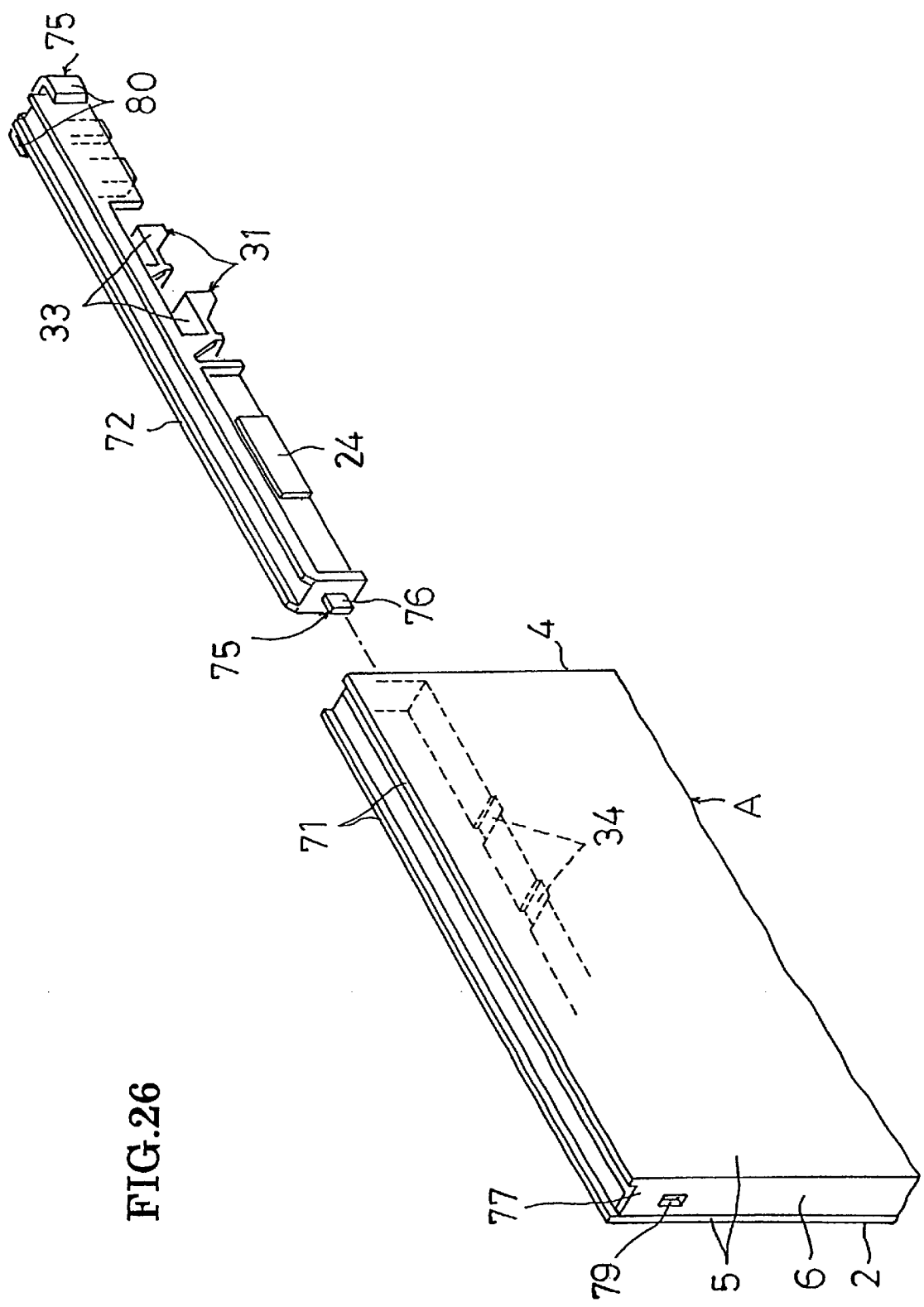
FIG. 26 is a perspective view illustrating a seventh embodiment.
Figure 27:
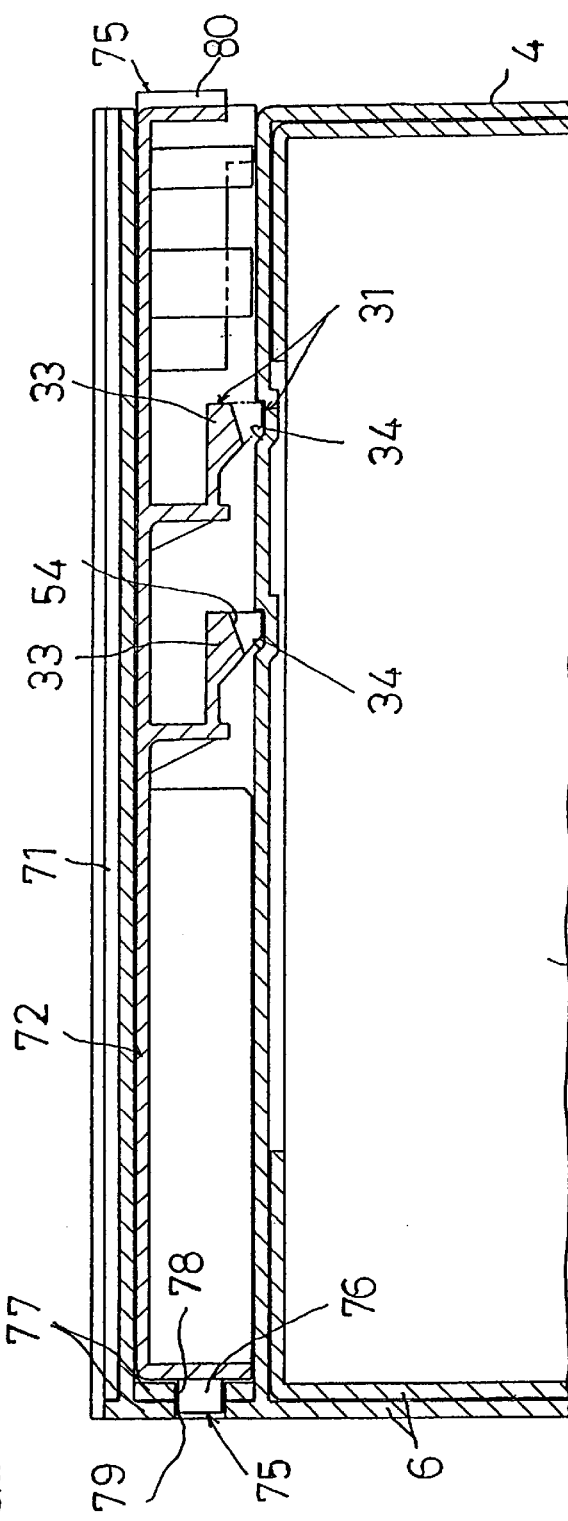
FIG. 27 is a longitudinal sectional front view with a slider being inserted into the case.
Figure 28:
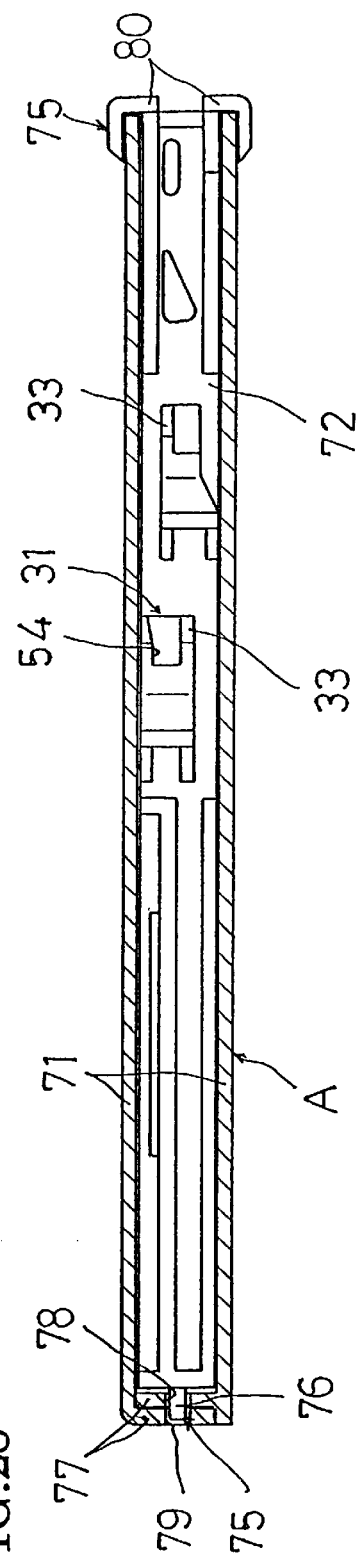
FIG. 28 is a vertically cut away bottom view of FIG. 27.

The commodity antitheft implement according to the fifth embodiment of the present invention is arranged so that assembled maintenance and release of the assembled maintenance is enabled through a locking device C, as illustrated in FIGS. 19 to 21. An interposing member 42 is interposed into a latch portion 41, such as a hole or interposing portion, formed on an object B so that theft shall be prevented. The interposing member 42 is folded into two portions to assemble both free ends thereof.

In the illustrated case, the object B (which theft thereof is to be prevented) and its latch portion 41 are trousers and a belt-inserting portion, and these may be comprised of button holes or holes formed on, for instance, mounts of blister-pack style of display cases. The crucial point is that the string-like or strap-like interposing member 42 may be interposed through.

In the illustrated case, the locking device C is arranged in so that flat box-shaped bodies 43, 43 for inward and outward fit are provided on both ends of the foldable interposing member 42 made of synthetic resin. Through-holes 7 similar to those of the above-described first and second embodiments are formed on overlapping or opposing peripheral walls of both box-shaped bodies 43, 43 that are fitted together. The key member 8 similar to those of the first, second and fourth embodiments is inserted through these coincident through holes 7, the key member 8 is prevented from being drawn out through engaging portion 31, and releasing tool 32 is used for drawing the key member 8 out. The interposing member 42 is of course provided with the antitheft tag 24, similar to those the first, second and fourth embodiments, at a portion other than the interior of the box-shaped bodies 43 of the locking device C or the key member 8.

By attaching the interposing member 42, it is possible to prevent theft through unauthorized removal of commodities. After sale of the commodity in question, the interposing member 42 is simply removed from the object B. It should be noted that the locking device C is not limited to the above arrangement, and locking and unlocking of the lock may also be affected by, for instance, inserting and operating a key provided at the store.

Since the guide 11, through holes 7, key member 8, engaging portion 31, releasing tool 32 and the tag 24 are similar to those of the first, second and fourth embodiments, detailed explanations will be omitted here.

The commodity antitheft implement according to the sixth embodiment of the present invention is arranged, as illustrated in FIGS. 22 to 25, in that a fitting member 61 for preventing forced opening of the case A is provided at a distal end of the key member 8 of the first to fourth embodiments to be outwardly fitted to a side of the case A upon completion of insertion of the key member 8.

The fitting member 61 is formed as a lever having a groove-like section that covers the peripheral walls 6 or both main walls 5, which comprise the side edge of the case A, from outside. Though the same member is formed in a linear shape fitting the entire length of a single side edge in the illustrated example, it is also possible to employ arrangements in which the fitting member 61 is formed to have an L-shape with two sides pinching the corner of side edges at which the through holes 7 are formed, or to have a U-shape with three sides pinching the comer, and further to employ two fitting members 61 projecting from the key member 8 in mutually opposite directions.

The crucial point is that opening shall be prevented by the fitting member 61, even if force is applied in a direction for opening the box body 2 or the cover body 4, by fitting the fitting member 61 from outside of the side edge(s) of the case A upon completion of insertion of the key member 8. It is further possible to prevent damage to the fitting portion into which the key member 8 is pierced.

It should be noted that since arrangements and actions of the engaging portion 31 of the inserted key member 8, the release of the engaged relationship of the engaging portion 31 through the releasing tool 32, uniform drawing of the releasing tool 32 and the key member 8, and those of the tag 24 or the guide 11 are similar to those of the first, third and fourth embodiments, detailed explanations will be omitted. In the drawing, 62 denotes an aperture for inserting the releasing tool 32 provided at the fitting member 61.

The commodity antitheft implement according to the seventh embodiment is arranged, as illustrated in FIGS. 26 to 31, so that the case A is comprised of a box body 2 having an opening portion 1 for inserting and removing a commodity, and a cover body 4 provided at the box body 2 through suitable hinges 3 and arranged to open and close the opening portion 1. Engaging walls 71, 71 are provided to be parallel with respect to the side edges of the box body 2 and the cover body 4 of the case A, and a slider 72 is provided to be freely inserted into and drawn out from the engaging walls 71, 71 to assume an engaged condition for maintaining the closed condition of the case A.

Figure 31:
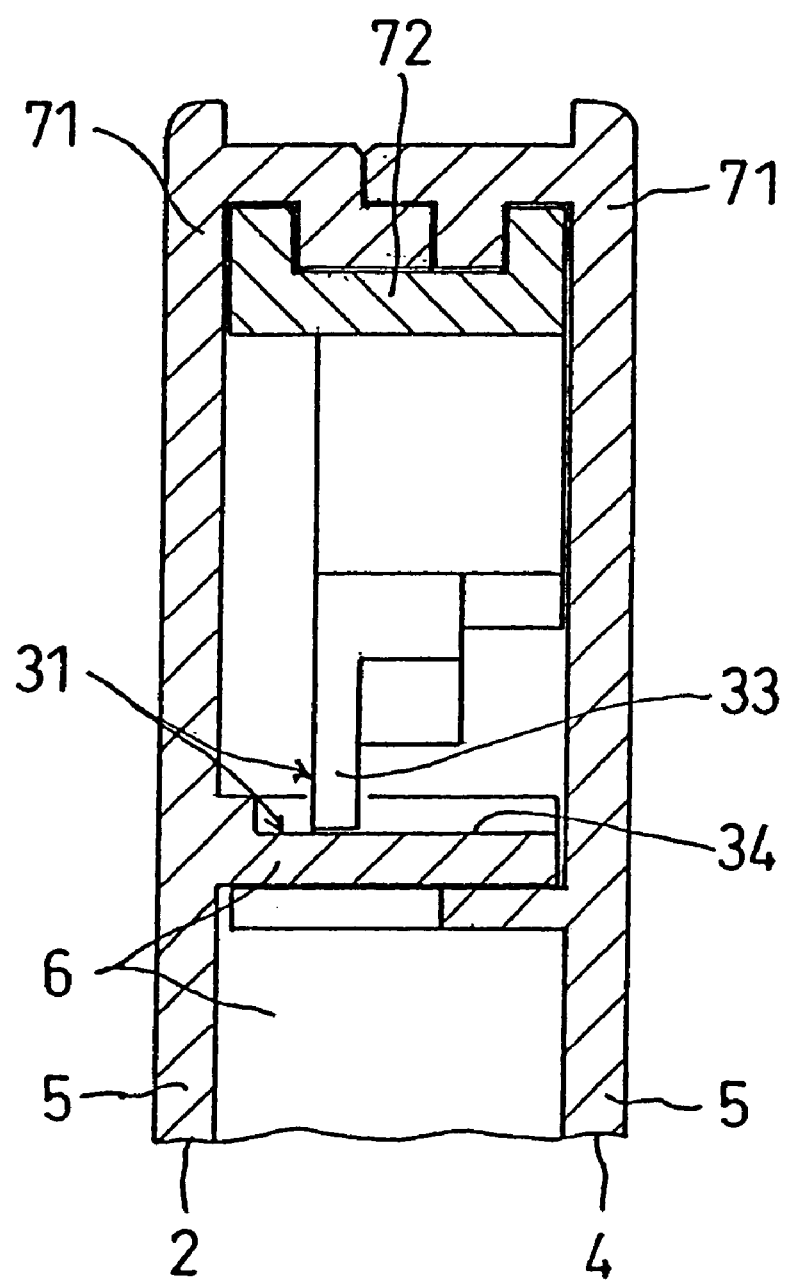
FIG. 31 is a longitudinal sectional side view of FIG. 29.

The engaging walls 71 are formed in a hook-like shape continuing from the main walls 5 forming the box body 2 and the cover body 4 as illustrated in FIG. 31. Upper edges of both side walls of the slider having a vertical section of the letter H are fitted and engaged at the engaging walls 71, 71, and opening of the box body 2 and the cover body 4 is prevented by the slider 72. It should be noted that the shapes of the engaging walls 71 and the slider 72 are not limited to those illustrated and any shape may be employed unless opening of the case A may be prevented through the engagement of the slider 72 and the engaging walls 71 due to the inserted slider 72.

The case A is similar to that of the first embodiment. Therefore, a detailed explanation will be omitted.

The slider 72 and the case A or the engaging walls 71 are provided with an engaging portion 31 that is pushed back upon insertion of the slider 72, and the engaging portion 31 prevents the slider 72 from being drawn out by automatically assuming an engaged relationship upon completion of insertion of the slider 72.

The engaging portion 31 includes engaging claws 33 and engaging holes or engaging apertures 34 similar to those of the fourth embodiment. Thus, explanations of the arrangement and actions thereof will be omitted.

For releasing the engaged condition of the engaging portion 31, a releasing tool 32 is inserted towards the engaging claws 33 as illustrated in FIGS. 29 and 30 is employed.

The releasing tool 32 may either be of a style similar to that of the third embodiment or arranged, as illustrated in FIGS. 29 and 30, so that two engaging claws 33 are disposed in the front and rear with respect to the inserting direction of the slider 72. The engaged condition is released by pushing the engaging claw 33 located more remote from the front by a bifurcated longer piece 73 and by pushing the engaging claw 33 in the front by a shorter piece 74.

Insertion of the releasing tool 32 is accomplished through an aperture in the engaging wall 71 for inserting the slider 72, and the tool 32 is inserted into a clearance formed between the slider 72 and peripheral walls 6 of the case A (i.e., between the engaging claws 33 and the engaging holes 34). For uniform removal of the releasing tool 32 and the slider 72, it is preferable to provide, in addition to using frictional force of overlapping surfaces, a latch portion 21, which is a combination of protrusion 22 and hole 23, similar to that of the second embodiment.

Latching mechanism 75 for preventing opening of the case A through force applied to the box body 2 and the cover body 4 in mutually opposite directions is formed on the case A and the slider 72 or the engaging walls 71 and the slider 72. The latching mechanism assumes a latched condition upon completion of insertion of the slider 72.

The illustrated latching mechanism 75 is comprised of a projecting shaft 76 formed at a leading end in an inserting direction of the slider 72, and a through hole 78 on one side and a through hole 79 on another side formed on overlapping walls 77 that are formed to continue from the main walls 5 of the box body 2 and the cover body 4 to overlap inwardly and outwardly. It is alternatively possible to employ a method in which the projecting shaft 76 is fitted through the through hole 78 into the hole 79 upon completion of insertion of the slider 72, or a method in which planar L-shaped carrying pieces 80 are formed on both sides of the distal end of the slider 72 with the carrying pieces 80 outwardly contacting both engaging walls. It is further possible to achieve the same effects through a fitting mechanism 75 provided on at least one end of the slider 72. It is preferable that the tag 24 be attached to the slider 72.

In the commodity antitheft implement according to the eighth embodiment of the present invention, case $A_1$ is comprised of, as illustrated in FIGS. 32 to 36, a box body 102 including an opening portion 101 for allowing insertion and removal of a commodity, and a cover body 104 provided at the box body 102 through hinges 103 and arranged to open and close the opening portion 101. Inwardly and outwardly overlapping peripheral walls 106, 106 are provided at peripheral edges of respective main walls 105 of the box body 102 and the cover body 104. In the illustrated hinges 103, the main wall 105 of the cover body 104 is provided at a peripheral wall 106 on a lower side of the box body 102 through the half-cut finished hinges 103.

Figure 32:
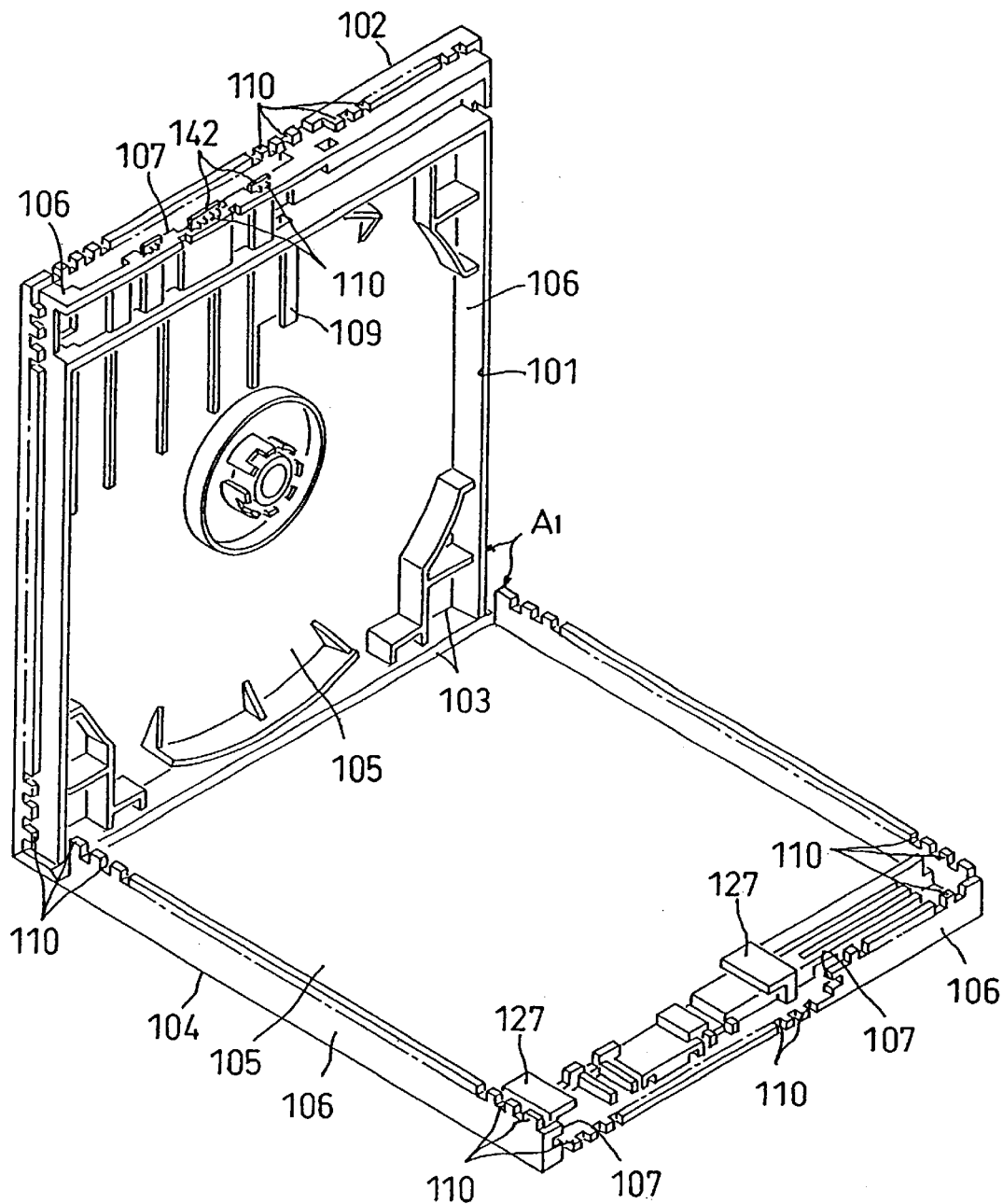
FIG. 32 is a perspective view illustrating an eighth embodiment.
Figure 34:
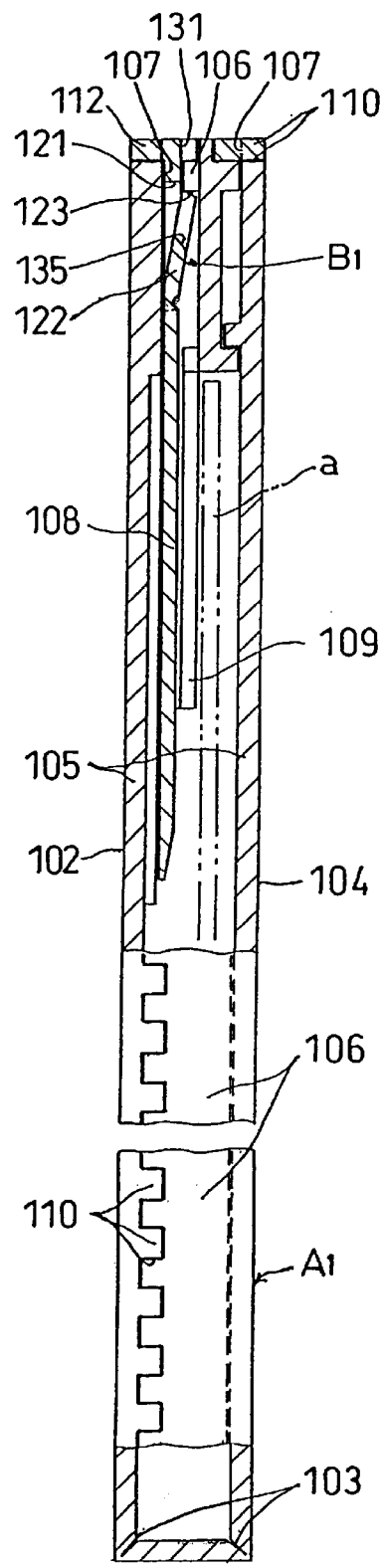
FIG. 34 is a longitudinal sectional side view with the key member being inserted into the case.
Figure 35:
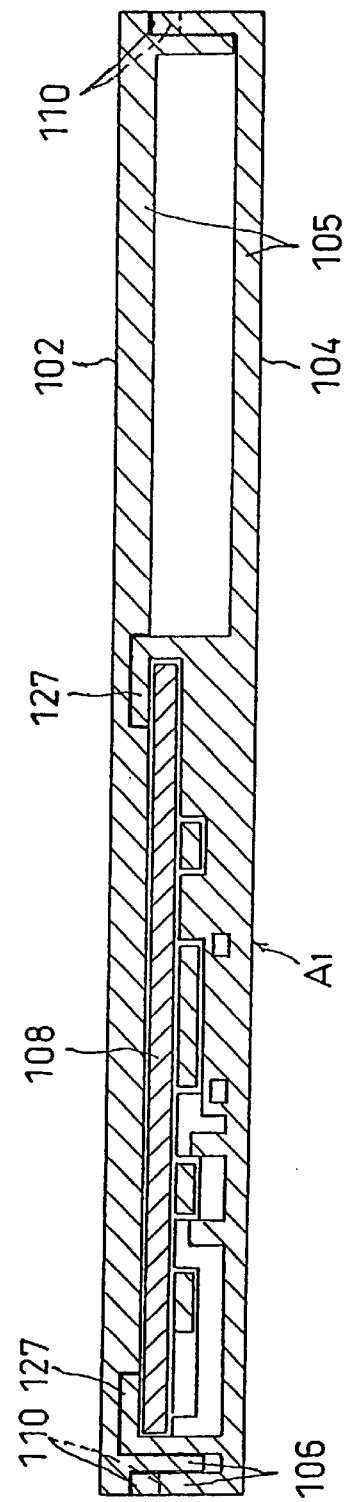
FIG. 35 is a vertically cut away plan view of FIG. 34.

Through holes 107, 107 that coincide with each other are formed at specified positions of both peripheral walls 106, 106 of the box body 102 and the cover body 104, and a key member 108 is inserted into these coincident through holes 107, 107 to be freely inserted and drawn out. Opening of the cover body 104 with respect to the box body 102 is prevented by the inserted key member 108. In the illustrated case, the coincident through holes 107, 107 of both peripheral walls 106, 106 are formed as an elongated hole on the inner peripheral wall 106 while a notch is formed on the outer peripheral wall 106 to extend from an open end of the cover body 104 towards the main wall 105. An L-shaped latching piece 127 is provided on an inner surface of the main wall 105 of the cover body 104 side to serve as an inserting guide for the key member 108 at the time of insertion and to carry both side edges of the key member 108. It should be noted that smooth insertion and removal of the key member 108 might be performed if a guide 109 for the key member 108 is provided on an inner surface of the main walls 105 of the box body 102 and the cover body 104, as illustrated in FIGS. 32 and 34.

Figure 36:
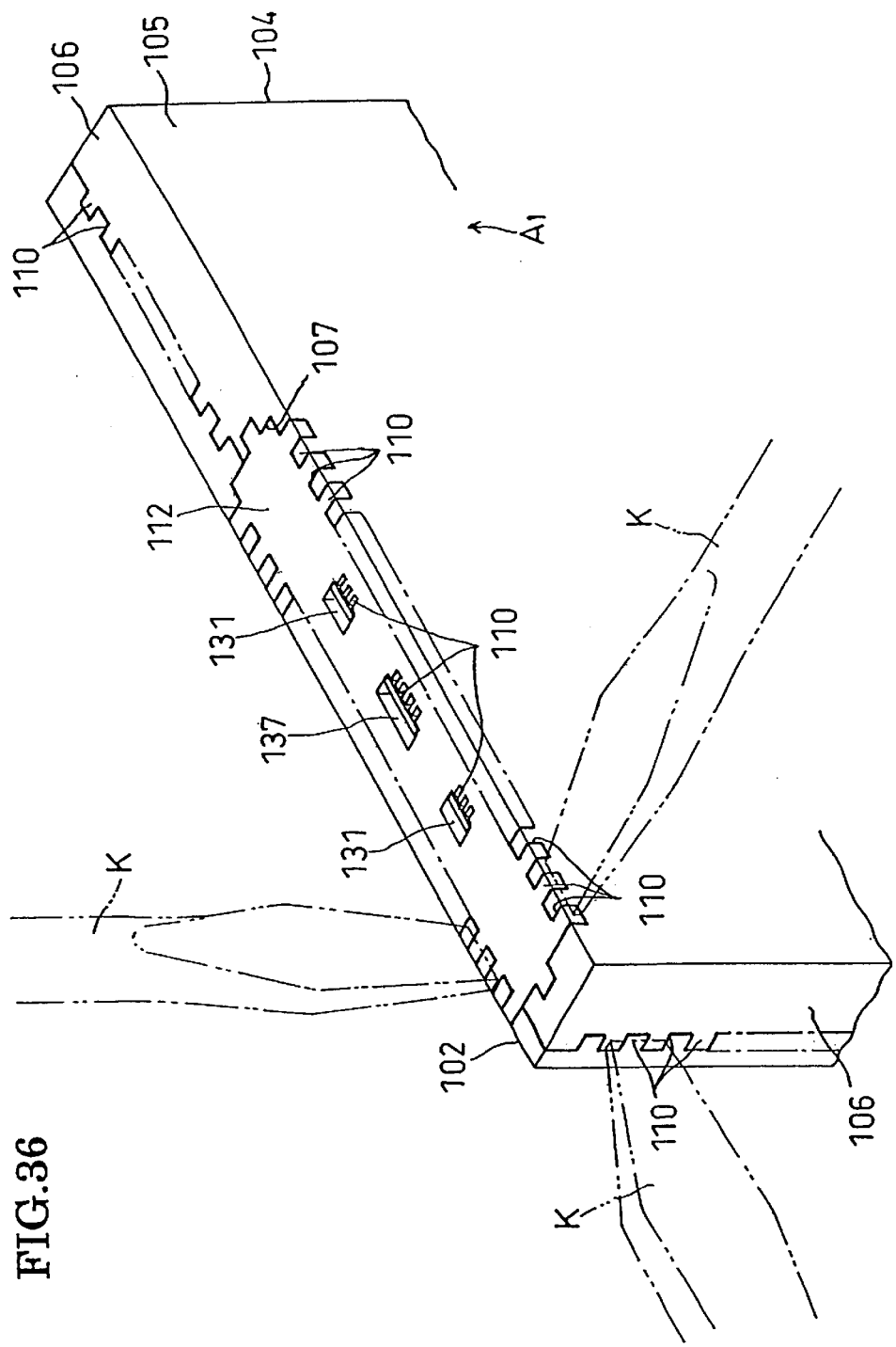
FIG. 36 is a perspective view illustrating principal parts of FIG. 35.

Continuous concave and convex portions 110 are formed to fit in a mutually meshing manner within specified regions at which a peripheral edge at a distal end opposite to the inserting direction of the key member 108 and open edges of the through holes 107 oppose. As illustrated in FIG. 36, even if one should try to forcibly press a head of a tool K, such as a minus driver, into a fitting portion between the through holes 107 and the key member 108, the head of the tool K will get blocked by the concave and convex edges of the concave and convex portion 110 to thereby prevent the pressing. Accordingly, it is possible to eliminate forcible opening through prying of the peripheral walls 6 by pressing the tool K therein or to eliminate damage to the fitting portion. If the length of projections, the depth of concave portions, and the width of the concaves and convexes of the concave and convex portions 110 are smaller than a length of a pointed edge with a flat tip of the tool K, picking operations of the tool K may be more effectively performed.

Figure 44:
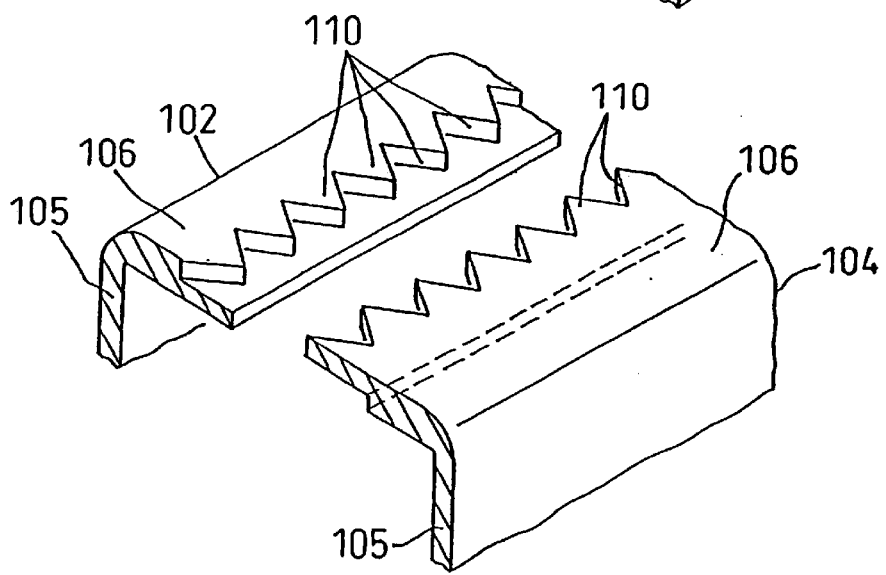
FIG. 44 is a perspective view illustrating another example of concave and convex portions.
Figure 45:
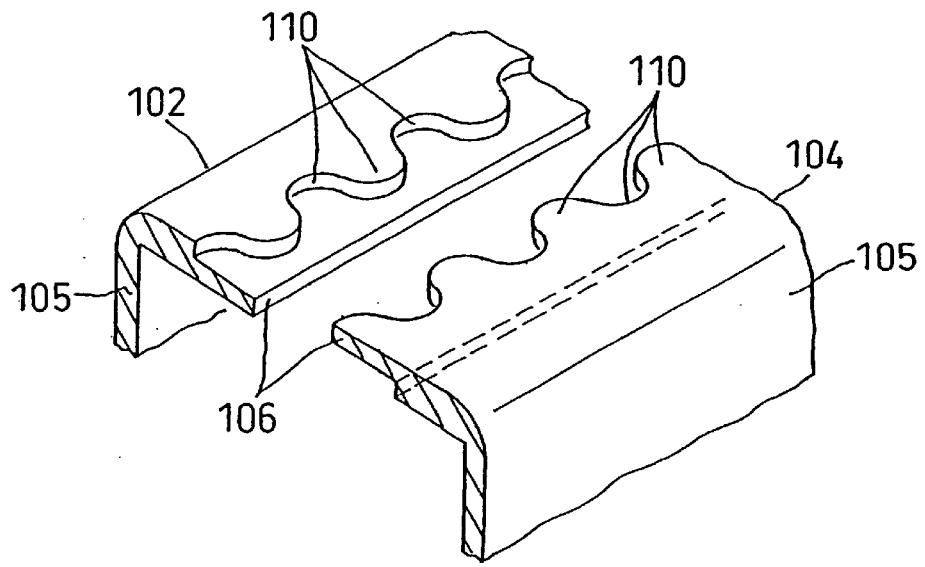
FIG. 45 is a perspective view illustrating still another example of concave and convex portions.

The shape of the concave and convex portions 110 is not limited to that of FIG. 36 and may have the shape of saw teeth as illustrated in FIG. 44 or waveform as illustrated in FIG. 45.

While the range for the concave and convex portions 110 formed on the opposing surfaces extend as far as the entire periphery of the fitting portion in the illustrated case, it is also possible to form these at longer side edges that are parallel to each other except for both ends of the fitting portion.

Figure 46:
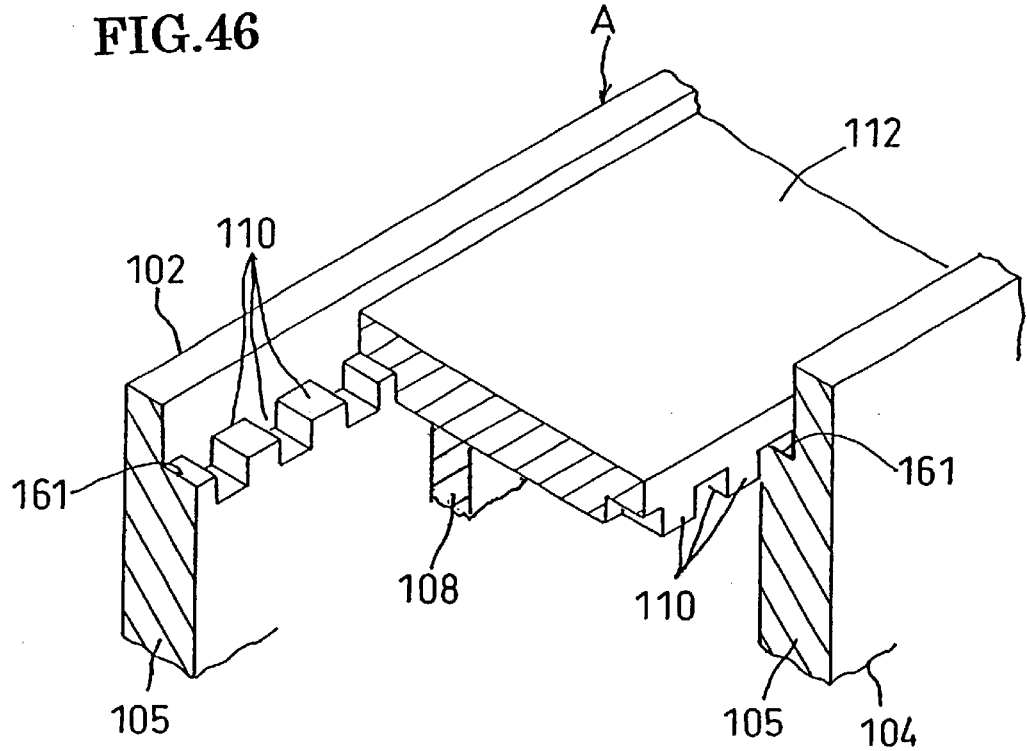
FIG. 46 is a partially cut perspective view illustrating still another example of concave and convex portions.

The opposing surfaces on which the concave and convex portions 110 are to be formed may be the plate surface of the key member 108 and the edges of the through holes 107, and the key member 108 and the main wall 105 of the case $A_1$. For example, as shown in FIG. 46, the portions 110 can be formed on an upper surface of a stepped portion 161 that is indented from below the through hole 107 formed on the inner surface of the main wall 105 and a lower surface that overlaps therewith when fitted into a distal end stepped portion 161 of the key member 108.

The key member 108 shall further be provided with an antitheft tag 111 by, for instance, adhesive or an embedding means formed at the time of molding. Since the tag 111 includes a particular ID code in a manner known per se, when one tries to pass the case $A_1$ with the key member 108 being inserted therein with the tag 111 through a gateway of a store, passing of the case $A_1$ may be detected upon resonance of a resonance circuit of the ID code provided at the gateway to generate a particular ID code and detection thereof upon demodulation through the high frequency electromagnetic field to consequently prevent theft.

Collection of the key member 108 in the store and engagement of the inserted key member 108 with the case $A_1$ will now be explained.

Figure 33:
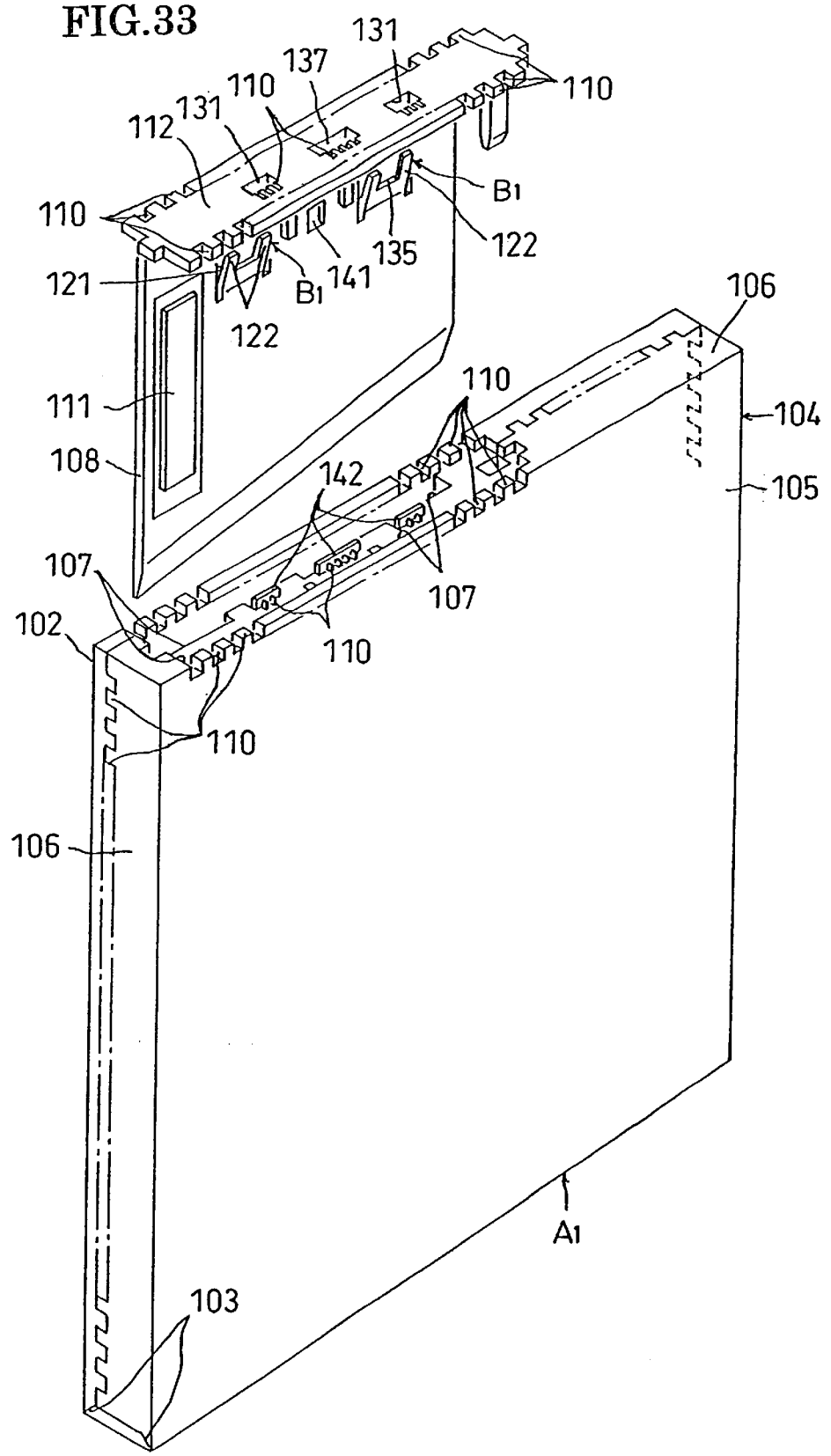
FIG. 33 is a perspective view of a key member and a case.

As illustrated in FIG. 33, a flange 112 that fits into through holes 107 upon completion of insertion of the key member 108 is provided at a distal end of the key member 108. In addition, the above-described concave and convex portions 110 are provided on both, the flange 112 and the through holes 102. While the flange 112 projects from both plate surfaces and side edges of the plate surfaces of the key member 108 in the illustrated case, it is also possible for the flange 112 to project from only one of the plate surfaces of the key member 108. In this case, concave and convex portions 110 shall be provided on a plate surface of the key member 108 other than that on which the flange 112 is formed. Since the width of the flange 112 is large, the width of a clearance formed between the main wall 105 of the through hole 107 formed on the outer peripheral wall 106 and the opening of the cover body 104 is defined to be a width into which the flange 112 is fitted if the through hole 107 is formed as an elongated hole. If the through hole 107 is formed as a notch, as in the above-described case, the flange 112 shall be inserted into the notch.

Figure 37:
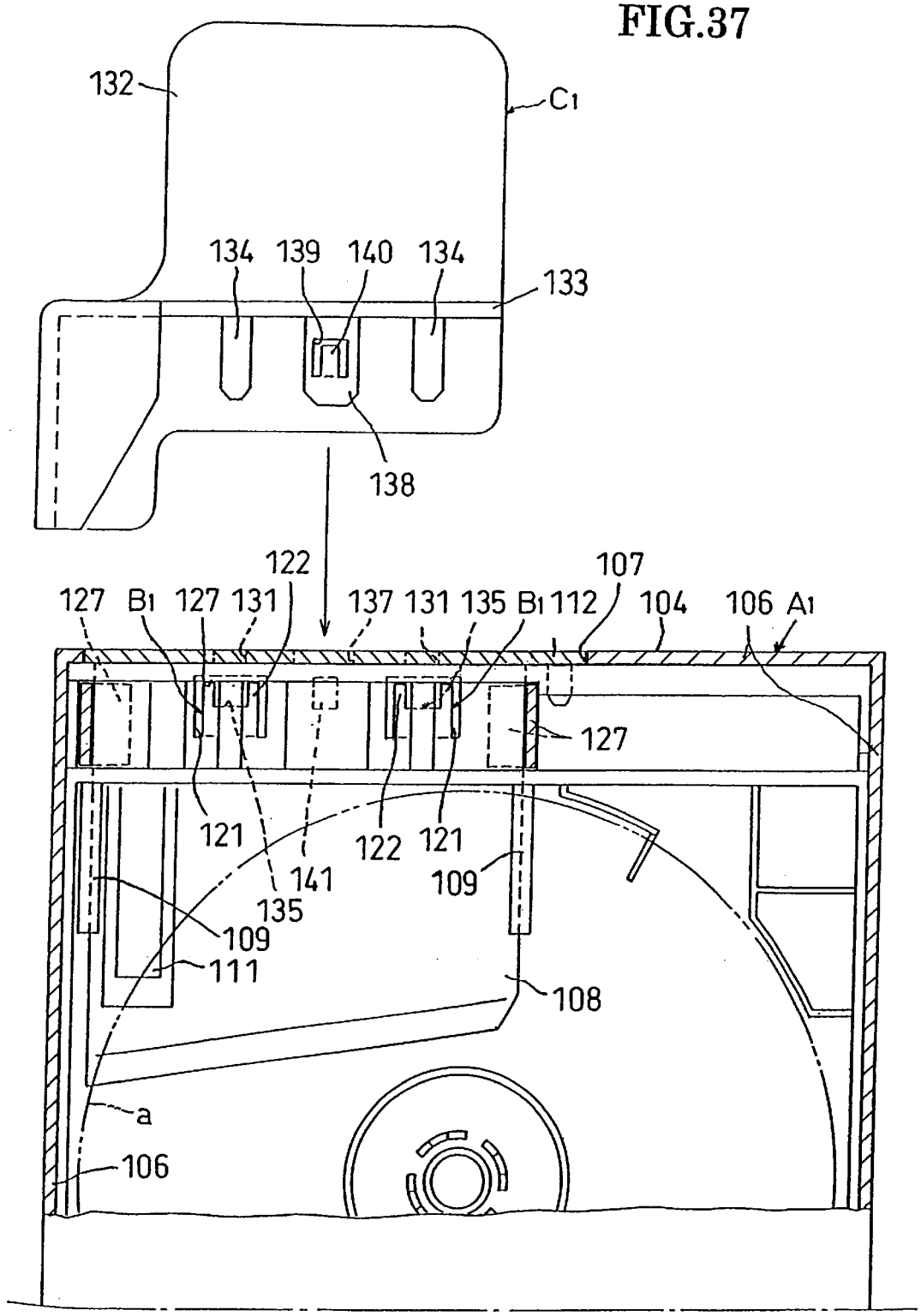
FIG. 37 is a partially cut away front view illustrating a condition for use of a releasing tool.

An engaging portion $B_1$ is formed on a surface at which the case $A_1$ and the key member 108 oppose each other. The engaging portion $B_1$ is pushed back during insertion of the key member 108, and automatically assumes an engaged condition upon completion of insertion. The engaging portion $B_1$ is arranged, as illustrated in FIGS. 33, 34 and 37, so that slits 121, which are substantially U-shaped with both ends facing downward, are cut into the key member 108. Inner sides of the slits 121 are made to project towards the main wall 105 of the cover body 104 to form engaging claws 122 provided to exhibit resilience utilizing characteristics of synthetic resin of which the key member 108 is made. An inner surface of the inner peripheral wall 106 functions as engaging element 123 that start pushing the engaging claws 122 back through the edges of the through holes 107 immediately after insertion of the key member 108 has been completed. The ends of the engaging claws 122 in the projecting direction thereof, which have been released from pushing force upon completion of insertion of the key member 108, engage with the engaging portions 123. It is alternatively possible to employ arrangements for the engaging portion $B_1$ in which separately arranged engaging claws are attached to the key member 108 through adhesive or the like, or in which the engaging element 123 is provided as a projecting portion formed at the main wall 105 of the box body 102. The number of engaging claws 122 is not limited to two formed on the right and left as in the illustrated case, and may be freely determined, and the engaging element 123 may also be formed on the cover body 104.

In using the above case $A_1$, the opening portion 101 of the box body 102 is first closed by the cover body 104, whereupon the key member 108 is inserted into the coincident through holes 107, 107. The engaging claws 122 are pushed back by the edges of the through holes 107, 107 during the insertion. Upon completion of insertion at which the through holes 107 of the outer peripheral wall 106 are fitted, the engaging claws 122 are released from contact with the edges of the through holes 107 and will restore upon release of the force pushing these back so that the claws 122 hook the engaging portions 123. Thus, the engaging portions 123 and the engaging claws 122 are engaged as illustrated in FIG. 34. Removal of the key member 108 by anyone other than the salesperson may be prevented by this engaged condition, and theft of the commodity within the case $A_1$ may thus be prevented.

Actions for removing the key member 108 by using releasing tool $C_1$ at the store will now be explained. As illustrated in FIGS. 37, 38 and 39, the releasing tool $C_1$ is located just above the engaging claws 122 of the flange 112. By providing elongated holes 131 that coincide with the through holes 107, jutting pieces 134 that project from a plate 133 with a grip 132 can be pierced into these elongated holes 131. When passing from central portions of ends in the projecting directions of the engaging claws 132, the pierced jutting pieces 134 function to push the engaging claws 122 back upon contact between bottom edges of the notches 135 and tapered surface portions 136 provided on one side edge of the ends of the projecting pieces 134 in a projecting direction thereof. In this manner, the engaged condition between the engaging claws 122 and the engaging portions 123 as illustrated in FIG. 34 will be released when the engaging portions 123 come off the engaging claws 122 as illustrated in FIG. 38. Then, the key member 108 may be withdrawn when pulling the releasing tool $C_1$ in a direction as indicated by the arrow in FIG. 39.

It should be noted that upon release of the engaged condition of the engaging claws 122, resilience acting on the engaging claws 122 that have been pushed back will function to press the engaging claws 122 against the jutting pieces 134. Therefore, the key member 108 may be withdrawn together with the releasing tool $C_1$ through frictional force caused through pressing.

In order to ensure the removal actions, as shown in FIG. 39, a through window 137 that coincides with the through holes 107 shall be formed next to the elongated holes 131 of the flange 112 such that a projecting piece 138 projecting from the plate 133 will pierce through the through window 137 and the through holes 107. The projecting piece 138 is formed with a slit 139 that is substantially U-shaped with both ends facing downward, and an inner side of the slit 139 projects towards the key member 108 to comprise a latching claw 140 that functions similar to the engaging claws 122.

The key member 108 is then formed with a latch portion 141 formed as a concave or through hole into which a tip of the latching piece 140 in the projecting direction thereof fits for latching upon completion of piercing of the projecting piece 138. It is of course also possible to form the latching piece 140 at the key member 108 while the latch portion 141 is formed on the projecting piece 138. In such a case, the latching piece 140 abutting against the key member 108 in the course of piercing the projecting piece 138 will be pushed back. Since the latching piece 140 and the latch portion 141 coincide when the engaged condition of the engaging claws 122 and the engaging portions 123 is released, the latching piece 140, which has been released from the pushing force, will fit into latch portion 141 to assume a latched condition as illustrated in FIG. 39. It is therefore possible to reliably remove the key member 108 when pulling the releasing tool $C_1$ out. The withdrawn key member 108 is left in the store for reuse, and the case $A_1$ which key member 108 has been collected is used as a case for sale or rent. Since no key member 108 with the tag 111 is present within the case $A_1$, it will be possible to omit any shield for case $A_1$.

It is also possible to exhibit the same effects as those explained above with reference to tool K by fitting pieces 142 projecting from the peripheral wall 106 into inward end edges of the elongated holes 131 or through window 137, and by providing the above-described concave and convex portions 110 on surfaces at which these pieces 142 and open edges of the elongated holes 131 or through window 137 oppose to make these concave and convex portions 110 mesh with each other, as illustrated in FIGS. 32, 33 and 36.

Both the projecting pieces 134 for releasing the engaged condition and projecting pieces 138 formed with latching pieces 140 for withdrawing the key member 108 are provided on the releasing tool $C_1$. It is also possible to draw the key member 108 out using an exclusively designed drawing tool comprising projecting pieces with latching pieces in case no engaging portion $B_1$ is provided for the case $A_1$ and the key member 108.

If the pieces 142 are fit into the through holes 131 or the through window 137, clearances allowing passing of jutting pieces 134 or projecting pieces 138 shall be provided.

Figure 42:
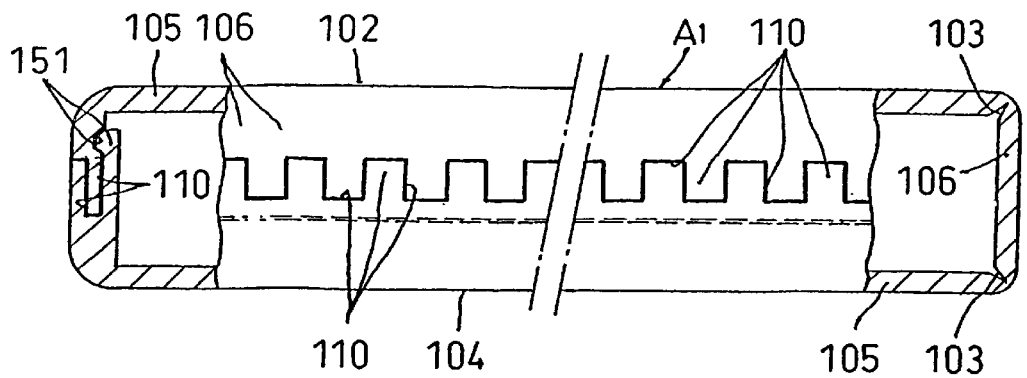
FIG. 42 is an enlarged plan view illustrating principal parts of FIG. 41.

In the commodity antitheft implement according to the ninth embodiment of the present invention, the case $A_1$ includes the box body 102 as illustrated in FIGS. 40 to 42, or as illustrated in FIGS. 32 and 33 in relation to the eighth embodiment. A cover body 104 is provided at the box body 102 through hinges 103 for opening and closing opening portion 101 of the box body 102. Continuous concave and convex portions 110 that fit with each other in a meshing condition are formed at specified regions on opposing surfaces of peripheral walls 106 of the case $A_1$ that inwardly and outwardly overlap with each other in an opening and abutting manner or on opposing surfaces of either one of the opening portion 101 of the outer peripheral wall 106 and the box body 102 or the cover body 104. While the region for providing the concave and convex portions 110 is defined to be other than the peripheral walls 106 at which the hinges 103 are formed in the eighth and ninth embodiments, they may be provided at arbitrary locations of the peripheral wall 6 upon suitable selection.

Figure 43:
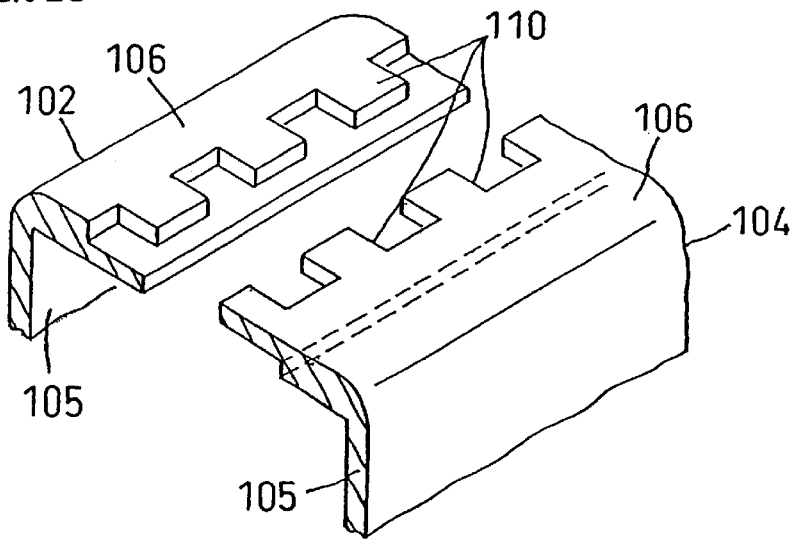
FIG. 43 is a perspective view illustrating concave and convex portions.

In the ninth embodiment, the concave and convex portions 110 are formed as stepped portions overlapping inwardly and outwardly at the opening portion of both peripheral walls 106, 106, as illustrated in FIGS. 42 and 43, since surfaces of both peripheral walls 106, 106 of the box body 102 and the cover body 104 are formed on the same plane. In addition, the stepped portion may be formed on opposing surfaces of the fitting and abutting portion.

It should be noted that the concave and convex portions 110 are formed on an opening edge surface of the outer peripheral wall 106 and on a rear surface of a side of the main wall 105 in the eighth embodiment. The concave and convex portions 110 may also be formed in a shape of saw teeth or waveform, as explained with reference to the eighth embodiment. Similar to the eighth embodiment, the concave and convex portions 110 that are in mesh with each other will prevent opening of the case $A_1$ through prying by piercing a tool.

In the drawing, 151 denotes a latching device of elastic piece style, and is a combination of a concave portion and a projecting portion.

The above arrangements of the commodity antitheft implement according to the present invention enable it to prevent pilferage of commodities within the case or removing cases storing therein commodities from the store without permission, with the effect of eliminating theft. Since key members with tags are left in the store upon sale or rent, it is advantageous that troublesome shielding may be omitted, and the key members may also be reused in the store. It is further possible to ensure accurate insertion along a specified line using the guide, and to prevent contact between stored articles within the case and the key members so that it is possible to eliminate breakage or damage to the accumulated articles.

Opening of the case through application of force in an opening direction thereof will be prevented through fitting members uniformly formed with the key members or latching device of sliders, and damage due to piercing portions of the key members or members thereof engaging the sliders may be prevented.

What is claimed is:

1. An anti-theft implement comprising:
a case including:
   a body portion having peripheral walls and having a through-hole formed in one of said peripheral walls; and
   a cover portion hinged to said body portion so as to be operable to move relative to said body portion to open and close said case, said cover portion having peripheral walls and having a through-hole formed in one of said peripheral walls such that said through-hole formed in one of said peripheral walls of said cover portion aligns with said through-hole formed in one of said peripheral walls of said body portion when said case is closed so as to form an insertion port in said closed case;
a reusable key member operable to be entirely inserted into and removed from said insertion port, said key member having an engaging portion for engaging said case so as to attach said key member to said case when said key member is entirely inserted into said insertion port, said key member being operable to prevent opening of said case when inserted into said insertion port;
a releasing tool operable to be inserted into said case so as to disengage said key member from said case and allow removal of said key member from said insertion port, and
a pair of latch portions for latching said releasing tool to said key member while said releasing tool disengages said key member from said case such that said releasing tool is operable to withdraw said key member from said insertion port.

2. The anti-theft implement of claim 1, wherein said case further includes a guide for guiding said key member inserted into said insertion port.

3. The anti-theft implement of claim 2, wherein said guide has an engaging hole, said engaging portion comprising a resilient claw operable to extend into said engaging hole so as to engage said case upon completion of insertion of said key member into said insertion port.

4. The anti-theft implement of claim 1, wherein said key member includes an anti-theft tag.

5. The anti-theft implement of claim 1, wherein said case further includes a projecting portion extending from an inner surface of said case, said engaging portion comprising a resilient claw operable to engage said projecting portion upon completion of insertion of said key member into said insertion port.

6. The anti-theft implement of claim 1, wherein said pair of latch portions comprises a latch opening formed on one of said key member and said releasing tool, and a latch protrusion formed on the other of said key member and said releasing tool, said latch protrusion being shaped so as to be inserted into said latch opening.

7. The anti-theft implement of claim 1, wherein said key member comprises a substantially flat plate.

8. The anti-theft implement of claim 1, wherein said key member and said case are formed so that no portion of said key member overhangs an outer surface of said case when said key member is inserted into said insertion port.

9. An anti-theft implement comprising:
a case including:
   a body portion having peripheral walls and having a through-hole formed in one of said peripheral walls; and
   a cover portion hinged to said body portion so as to be operable to move relative to said body portion to open and close said case, said cover portion having peripheral walls and having a through-hole formed in one of said peripheral walls such that said through-hole formed in one of said peripheral walls of said cover portion aligns with said through-hole formed in one of said peripheral walls of said body portion when said case is closed so as to form an insertion port in said closed case;
a reusable key member operable to be inserted into and removed from said insertion port, said key member having an engaging portion for engaging said case so as to attach said key member to said case when said key member is inserted into said insertion port, and said key member having a latch portion, said key member being operable to prevent opening of said case when inserted into said insertion port; and
a releasing tool operable to be inserted into said case so as to disengage said key member from said case, said releasing tool having a latch portion operable to latch said releasing tool to said latch portion of said key member while said releasing tool disengages said key member from said case such that said releasing tool is operable to withdraw said key member from said insertion port.

10. The anti-theft implement of claim 9, wherein said case further includes a guide for guiding said key member inserted into said insertion port.

11. The anti-theft implement of claim 10, wherein said guide has an engaging hole, said engaging portion comprising a resilient claw operable to extend into said engaging hole so as to engage said case upon completion of insertion of said key member into said insertion port.

12. The anti-theft implement of claim 9, wherein said key member includes an anti-theft tag.

13. The anti-theft implement of claim 9, wherein said case further includes a projecting portion extending from an inner surface of said case, said engaging portion comprising a resilient claw operable to engage said projecting portion upon completion of insertion of said key member into said insertion port.

14. The anti-theft implement of claim 9, wherein one of said latch portion of said key member and said latch portion of said releasing tool comprises a latch opening, and the other of said latch portion of said key member and said latch portion of said releasing tool comprises a latch protrusion, said latch protrusion being shaped so as to be inserted into said latch opening.

15. The anti-theft implement of claim 9, wherein said key member comprises a substantially flat plate.

* * * * *